US008645110B1

(12) United States Patent
Weckner et al.

(10) Patent No.: US 8,645,110 B1
(45) Date of Patent: Feb. 4, 2014

(54) EFFICIENT DESIGN OF SHEAR-DEFORMABLE HYBRID COMPOSITE STRUCTURES

(75) Inventors: Olaf Weckner, Seattle, WA (US); Vladimir Balabanov, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 311 days.

(21) Appl. No.: 13/109,991

(22) Filed: May 17, 2011

(51) Int. Cl.
*G06F 17/50* (2006.01)
(52) U.S. Cl.
USPC .............. 703/2; 703/6; 428/411.1; 428/36.91
(58) Field of Classification Search
USPC .............................. 703/2, 6; 428/411.1, 36.91
See application file for complete search history.

(56) References Cited

U.S. PATENT DOCUMENTS

| | | | | |
|---|---|---|---|---|
| 4,757,658 | A * | 7/1988 | Kaempen | 52/309.16 |
| 4,786,536 | A * | 11/1988 | Kaempen | 428/36.3 |
| 7,010,472 | B1 * | 3/2006 | Vasey-Glandon et al. | 703/6 |
| 2002/0028332 | A1 * | 3/2002 | Pratt | 428/364 |
| 2004/0048022 | A1 * | 3/2004 | Pratt | 428/36.91 |
| 2006/0029807 | A1 * | 2/2006 | Peck | 428/411.1 |
| 2010/0121625 | A1 * | 5/2010 | Krog | 703/6 |
| 2010/0223029 | A1 | 9/2010 | Klog | |

OTHER PUBLICATIONS

Zafer Gurdal et al., "Design and Optimization of Laminated Composite Materials", Mar. 16, 1999, pp. 61-72 and 127-14.
M. V.V.Murthy, NASA Technical Paper, "An Improved Transverse Shear Deformation Theory for Laminated Anisotropic Plates," Nov. 1981.
Wikipedia Article, "Reissner-Mindlin PlateTheory," <http://en.wikipedia.org/wiki/Plate_theory#Mindlin-Reissner_theory_for_thick_plates>, last visited May 10, 2011.
Wikipedia Article, "Kirchhoff—Love PlateTheory," <http://en.wikipedia.org/wiki/Kirchhoff%E2%80%93Love_plate_theory>, last visited May 10, 2011.
Joachim L. Genestedt, "Lamination Parameters for Reissner-Mindlin Plates," May 9, 1994.
Cezar Diaconu et al., "Feasible Region in General Design Space of Lamination Parameters for Laminated Composites," AIAA Journal, vol. 40, No. 3, Mar. 2002.

* cited by examiner

*Primary Examiner* — Thai Phan

(57) ABSTRACT

A method of configuring a composite laminate may include selecting at least two different material systems for the laminate. Each one of the material systems may have material properties and corresponding material invariants. The laminate may be comprised of a stack of plies having a stacking sequence. The method may include characterizing the stacking sequence using lamination parameters for each material system. The method may further include calculating a transverse shear stiffness of the laminate using the material invariants and the lamination parameters.

20 Claims, 9 Drawing Sheets

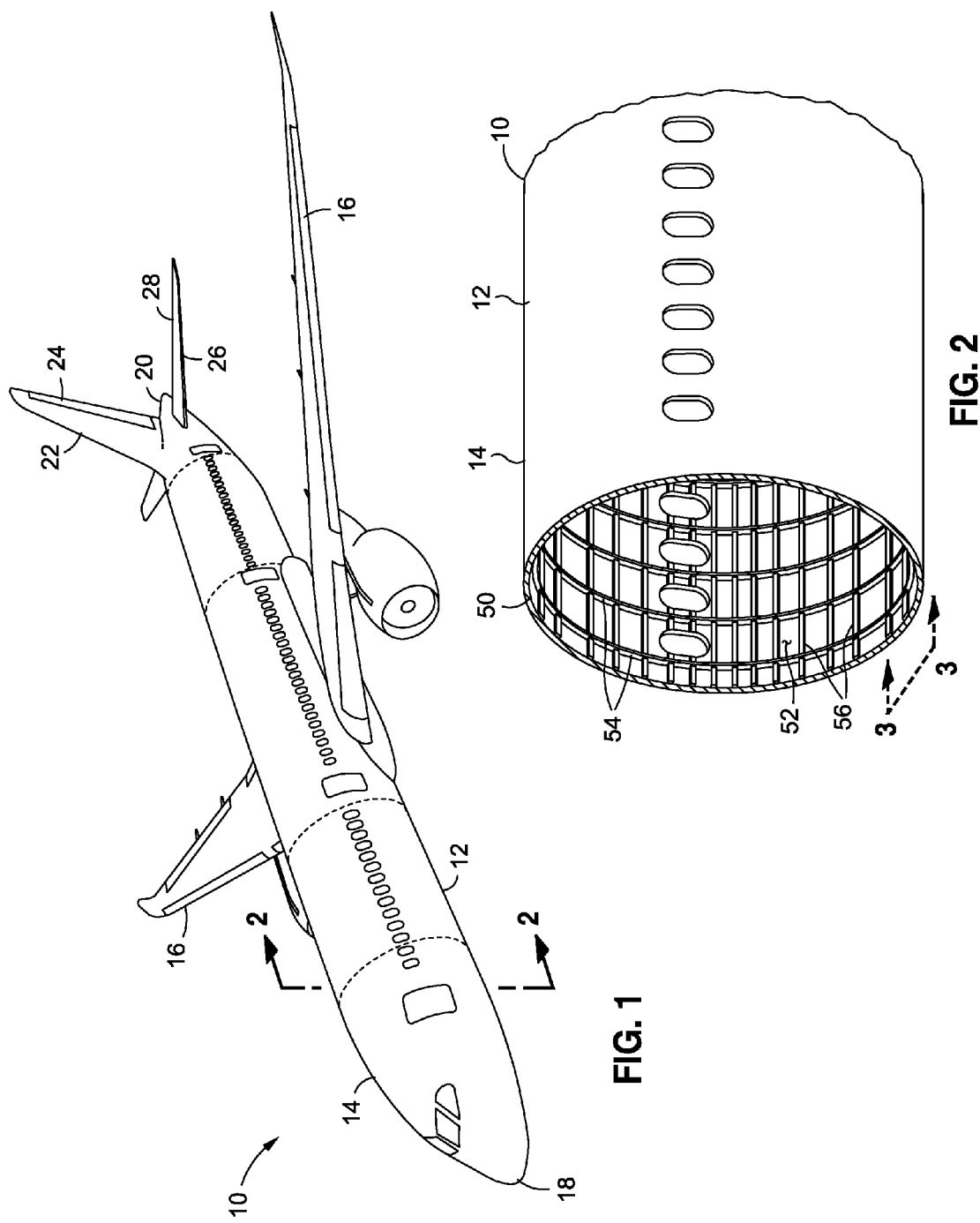

EFFICIENT DESIGN OF SHEAR-DEFORMABLE HYBRID COMPOSITE STRUCTURES

FIELD

The present disclosure relates generally to composite structures and, more particularly, to systems and methods for analyzing the performance of composite structures.

BACKGROUND

Composite structures provide several advantages over metallic structures. For example, composite structures can be configured to provide high specific stiffness and high specific strength relative to metallic structures. Furthermore, composite structures can be tailored to provide a relatively high degree of strength and stiffness along a primary load path. The ability to tailor the strength and stiffness of composites may result in lightweight structures. In addition, composite materials may have improved fatigue resistance relative to metallic materials and are more resistant to corrosion.

Composite structures may be formed as a stack of relatively thin layers or plies that are laminated together. Each ply in the composite laminate may include fibers that serve as the primary load-carrying constituent. The composite material may be formed as unidirectional tape wherein the fibers in each ply are oriented parallel to one another and are held in position by a matrix constituent such as an epoxy resin. The matrix constituent may also redistribute loads between adjacent fibers.

The composite structure may be configured such that the fibers in one ply are oriented in the same direction of the composite structure or in a different direction than the fibers in adjacent plies. The relative orientations of the plies may be selected to provide the desired strength and stiffness characteristics of the composite structure. Each ply in the composite laminate may be formed of the same material system. However, composite structures may also be formed as hybrid structures containing plies formed of different materials to achieve a desired design objective. For example, a hybrid composite structure may primarily include plies formed as unidirectional carbon fiber tape for load-carrying purposes. The hybrid composite structure may also include one or more outer plies formed of woven fiberglass cloth to provide improved impact resistance to the composite structure.

Conventional methods of designing a composite structure include constructing a finite element model (FEM) of the structure and subjecting the FEM to loads to determine the stresses and strains in the structure and to perform sizing of the structure to meet strength, stiffness and weight requirements. An FEM is typically comprised of a mesh of multiple finite elements. Each element may represent one or more components or sub-components of the composite structure. For example, a barrel section of an aircraft fuselage may include a composite laminate skin attached to a series of frames and stringers, each of which may also be formed as composite laminates. An FEM of the fuselage may be constructed simulating the skin and stringer geometry. The composite laminate stringer may be formed in a closed hat shape made up of several sub-components such as a cap, a pair of webs, a pair of flanges, an inner wrap laminate, and a plank laminate which may be bonded or co-cured together after which the skin may be bonded to the stringers and other structural components that make up the barrel section.

The process of designing the barrel section of the fuselage may include optimizing several design variables. Such design variables may include the geometry of the components and subcomponents that make up the fuselage. The geometry may include the size (i.e., length, width, height) and the shape of the components and sub-components. For example, the geometry design variables for a stringer may include the width of the cap, the width of the flanges, the height of the webs above the flanges, the angle at which the webs are oriented relative to the flanges, and other geometry design variables.

Additional design variables that may be optimized in the design process include the ply arrangement for the composite laminates of the skin and the stringer to meet strength, stiffness, weight and other requirements. Conventional methods of designing composite laminates include a determination of the stacking sequence of the laminate including a determination of the individual ply thickness, the fiber angle of each ply, and the relative location of the ply in the through-thickness direction. For certain structures, loading conditions may dictate a laminate thickness requiring a relatively large quantity of plies. For example, a wing panel of an aircraft may require up to one hundred or more plies of composite material, each of which requires the determination of the fiber angle and the ply thickness. As may be appreciated, a ply-by-ply determination of such a stacking sequence for relatively thick composite laminates adds a large quantity of design variables to the design process which significantly increase the complexity of the design process.

A further design variable that may be included in designing a composite structure is the material system of the plies that make up the composite laminate. For example, as indicated above, it may be desirable to form the composite structure as a hybrid comprised of two or more material systems. For example, a hybrid composite structure may include plies of unidirectional composite tape for load-carrying purposes and one or more outer plies of composite cloth for impact resistance or other purposes. Unfortunately, conventional design methods are not understood to provide an efficient means for optimizing hybrid composite laminate containing two or more material systems.

Even further, conventional methods of designing composites plates such as Classical Lamination Theory do not account for transverse shear deformation which may be an important consideration in relatively thick composite laminates. Transverse shear deformation may occur when a structure is subjected to certain loads or combinations of loads that result in shear stresses and shear strains contributing to shear deformation in the structure. Under relatively high shear loads, excessive transverse shear deformation may compromise the buckling stability of the composite laminate. Failure to account for transverse shear deformation in relatively thick composite laminates may result in under-conservative designs.

As can be seen, there exists a need in the art for a system and method for optimizing a composite structure that can accommodate a large quantity of plies in a computationally efficient manner and which may account for transverse shear deformation. Furthermore, there exists a need in the art for a system and method for optimizing hybrid composite laminates having composite plies formed of two or more material systems.

SUMMARY

The above-noted needs associated with hybrid composites are specifically addressed and alleviated by the present disclosure which, in an embodiment, provides a method of configuring a composite laminate including selecting at least two different material systems for the laminate. Each one of the material systems may have material properties and corresponding material invariants. The laminate may be comprised of a stack of plies having a stacking sequence. The method may include characterizing the stacking sequence using lamination parameters for each material system. The method may further include calculating a transverse shear stiffness of the laminate using the material invariants and the lamination parameters.

In a further embodiment, disclosed is a method of configuring a laminate having a stack of plies oriented at one or more ply angles and formed in one or more ply thicknesses. The laminate may have a desired laminate property. The method may include selecting at least two material systems for the plies of the laminate. Each one of the material systems may have material properties. The method may further include calculating, for each material system, material invariants based on the material properties. In addition, the method may include calculating, for each material system, lamination parameters based on the ply angles and the ply thicknesses. The method may further include calculating a transverse shear stiffness of the laminate and an in-plane/bending stiffness of the laminate using the material invariants and the lamination parameters. A laminate property may be calculated based on the transverse shear stiffness and the in-plane/bending stiffness of the laminate. The method may include adjusting the material invariants and/or the lamination parameters until the calculated laminate property is within a predetermined range of the desired laminate property.

Also disclosed is a processor-based system for configuring a composite laminate. The processor-based system may comprise a material system selector, a stacking sequence characterizer, and transverse shear stiffness calculator. The material system selector may select at least two material systems of the laminate wherein each one of the material systems may have material properties and corresponding material invariants. The stacking sequence characterizer may characterize a stacking sequence of the laminate for each material system. The transverse shear stiffness calculator may calculate a transverse shear stiffness of the laminate using the material invariants and the lamination parameters.

Many modifications of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

BRIEF DESCRIPTION OF THE DRAWINGS

These and other features of the present disclosure will become more apparent upon reference to the drawings wherein like numerals refer to like parts throughout and wherein:

FIG. 1 is a perspective view of an aircraft having a fuselage;

FIG. 2 is a perspective view of a barrel section of the fuselage taken along line 2 of FIG. 1 and illustrating a skin mounted to a plurality of stringers and frames;

DETAILED DESCRIPTION

Figure 3:
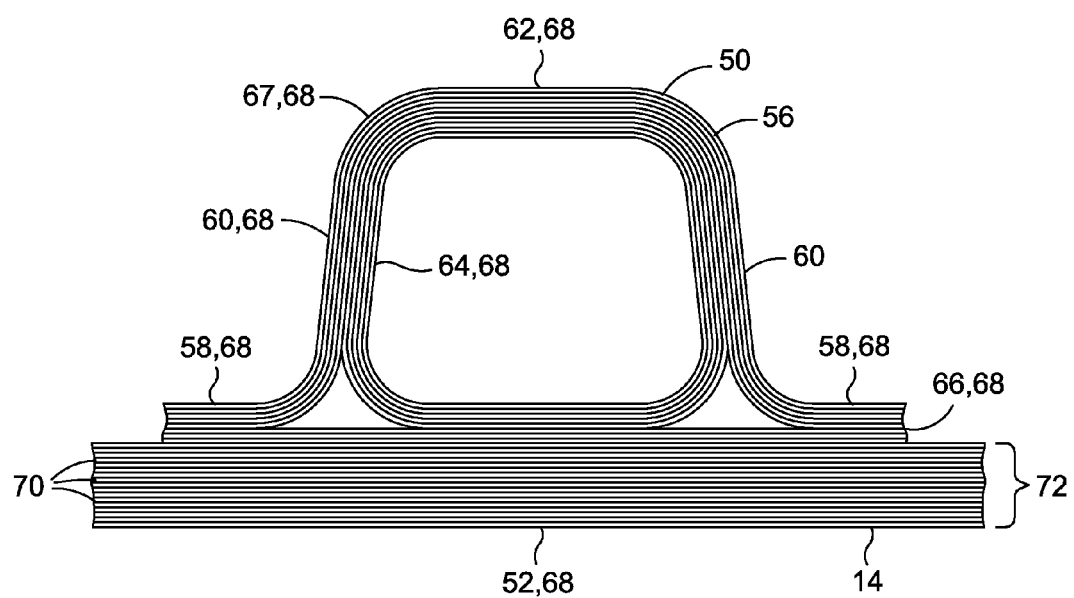
FIG. 3 is a cross-sectional illustration of a portion of the skin and one of the stringers illustrating the composite laminate construction thereof.

Referring now to the drawings wherein the showings are for purposes of illustrating preferred and various embodiments of the disclosure, shown in FIG. 1 is a perspective view of an aircraft 10 which may be at least partially formed of composite material. For example, the aircraft 10 may include a fuselage 14 and a pair of wings 16 that may be formed of composite material. The fuselage 14 extends from the aircraft 10 nose 18 to a tail 20 at a rear end of the fuselage 14. The tail 20 may include a horizontal stabilizer 26, an elevator 28, a vertical stabilizer 22, and a rudder 24, each of which may also be formed of composite material.

As shown in FIG. 2, the fuselage 14 structure 50 may be formed as one or more barrel sections 12 and may include a skin 52 that may be formed as a composite laminate 68. The fuselage 14 skin 52 may be mounted to a plurality of circumferentially-spaced stringers 50 and a plurality of axially-spaced frames 54 which may also be formed as composite laminates 68. For example, FIG. 3 illustrates a cross-section of a portion of the skin 52 and one of the longitudinal stringers 50. The skin 52 and stringer 56 may be bonded to one another. Each composite laminate 68 may comprise a stack 72 of composite plies 70 formed of one or more material systems. Each ply 70 has a ply thickness (not shown) and may be oriented at a fiber angle (not shown) relative to the laminate 68. The stringer 56 may be formed as a subassembly of composite laminates 68 that may be assembled and bonded together or co-cured. For example, the stringer 56 may include a plank 66 laminate 68, a wrap 64 laminate 68, and a primary 67 laminate 68 comprised of flanges 58, webs 60 and a cap 62.

The present disclosure includes embodiments of a system and method for determining the stiffness characteristics of composite laminates such that the laminates may be optimized for a given design objective such as weight or strength or other objectives. Advantageously, the embodiments disclosed herein provide a means for efficiently determining the stiffness characteristics for laminates comprised of a large quantity of plies. In addition, the disclosed embodiments may determine the transverse shear stiffness of the laminate for hybrid composites as may be desired for large quantities of plies wherein buckling stability is a consideration. The embodiments of the system and method disclosed herein advantageously employ lamination parameters and material invariants in a computationally efficient manner to characterize the in-plane/bending stiffness and the transverse shear stiffness of a composite laminate having large quantities of plies formed of different material systems.

Figure 4:
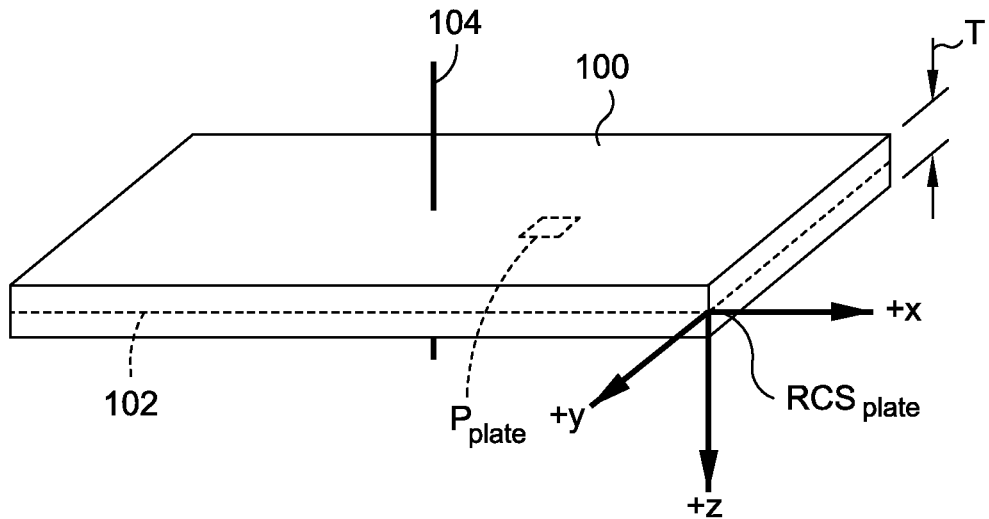
FIG. 4 is a perspective illustration of a plate having a midplane and a midplane normal for illustrating displacement of the plate.

Referring to FIG. 4, the system and method of characterizing the stiffness of a composite laminate 68 (FIG. 3) may be described by initially describing the strain-displacement relationships associated with plate theory. In the disclosed embodiment, shown is a plate 100 having a midplane 102 and a normal 104 to the midplane 102 and a plate coordinate system $RCS_{plate}$. Following the so-called First Order Shear Deformation Theory, also known as the Reissner-Mindlin plate theory, the displacement or deformation of the plate 100 may be characterized as follows:

$$u_1(x_1,x_2,x_3) \equiv u_x(x,y,z) = u^0(x,y) + z\phi_x(x,y) \quad \text{(Equation 10)}$$

$$u_2(x_1,x_2,x_3) \equiv u_y(x,y,z) = v^0(x,y) + z\phi_y(x,y) \quad \text{(Equation 20)}$$

$$u_3(x_1,x_2) \equiv u_z(x,y,z) = w^0(x,y) \quad \text{(Equation 30)}$$

wherein $u^0(x,y) = u_x(x,y,0)$, $v^0(x,y) = u_y(x,y,0)$, and $w^0(x,y) = u_z(x,y,0)$ represent displacements at the midplane 102 for a given (x,y) location on the plate 100. $\phi_x(x,y)$ represents bending rotation of the midplane 102 under bending about the positive y axis for the (x,y) location on the plate 100. $\phi_y(x,y)$ represents bending rotation of the midplane 102 under bending about the negative x axis for the (x,y) location on the plate 100.

In-plane strains in the plate 100 may be determined by applying the infinitesimal strain theory wherein $\in_{ij} = \frac{1}{2}(\partial_{xi}u_j + \partial_{xj}u_i)$, such that the normal (i.e., axial) strains $\in_x = \in_{xx}$ and $\in_y = \in_{xx}$ and the shear strains $\gamma_x = 2\in_{xy}$ may be defined as:

$$\begin{pmatrix} \varepsilon_{xx}(x,y,z) \\ \varepsilon_{yy}(x,y,z) \\ 2\varepsilon_{xy}(x,y,z) \end{pmatrix} = \begin{pmatrix} \in_x(x,y) \\ \in_y(x,y) \\ \gamma_{xy}(x,y) \end{pmatrix} + z \begin{pmatrix} \kappa_x(x,y) \\ \kappa_y(x,y) \\ \kappa_{xy}(x,y) \end{pmatrix} \quad \text{(Equation 40)}$$

which may be expressed in simplified form as:

$$\epsilon(x,y,z) = \in(x,y) + z\kappa(x,y) \quad \text{(Equation 50)}$$

wherein $\kappa$ represents a curvature of the deformed plate 100 at location (x,y) and wherein:

$$\in_x(x,y) = \partial_x u(x,y) \quad \text{(Equation 60)}$$

$$\in_y(x,y) = \partial_y v(x,y) \quad \text{(Equation 70)}$$

$$\gamma_{xy}(x,y) = \partial_y u(x,y) + \partial_x v(x,y) \quad \text{(Equation 80)}$$

$$\kappa_x(x,y) = \partial_x \phi_x(x,y) \quad \text{(Equation 90)}$$

$$\kappa_y(x,y) = \partial_y \phi_y(x,y) \quad \text{(Equation 100)}$$

$$\kappa_{xy}(x,y) = \partial_x \phi_y(x,y) + \partial_y \phi_x(x,y) \quad \text{(Equation 110)}$$

The above-described strains $\in$, $\gamma$ comprise the in-plane strains of the plate 100 under deformation. The transverse shear strains $\gamma = (\gamma_{yz}, \gamma_{xz})^T$ in the deformed plate 100 may be constant through the thickness T of the plate 100 and may be expressed as follows:

$$\gamma_{xz}(x,y) = \phi_x(x,y) + \partial_x w(x,y) \quad \text{(Equation 120)}$$

$$\gamma_{yz}(x,y) = \phi_y(x,y) + \partial_y w(x,y) \quad \text{(Equation 130)}$$

Figure 5:
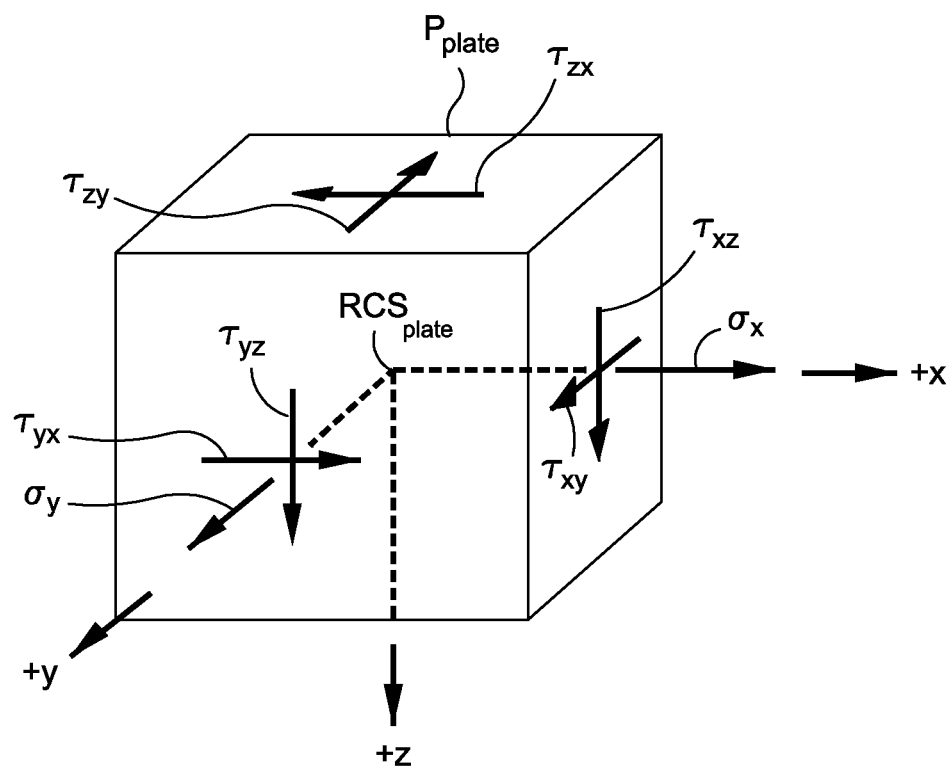
FIG. 5 is an illustration of an infinitesimal plate element of the plate of FIG. 4 and illustrating the orientations of the tensile stresses and shear stresses in the plate in alignment with the plate coordinate system.

As described in greater detail below, shear factors $k_x$ and $k_y$ may be applied to the shear strains to substantially match the elastic energy resulting from an assumed constant distribution (not shown) through the thickness T with the elastic energy from the known parabolic distribution (not shown) wherein the stresses are generally zero at the plate boundaries (not shown). FIG. 5 illustrates orientations of in-plane tensile stresses $\sigma_x$, $\sigma_y$, the in-plane shear stresses $\tau_{xy}$, the transverse shear stresses $\sigma_{xz}$, $\sigma_{yz}$ which may induce the in-plane strains and transverse shear strains on a plate element $P_{plate}$ of the plate 100.

Figure 6:
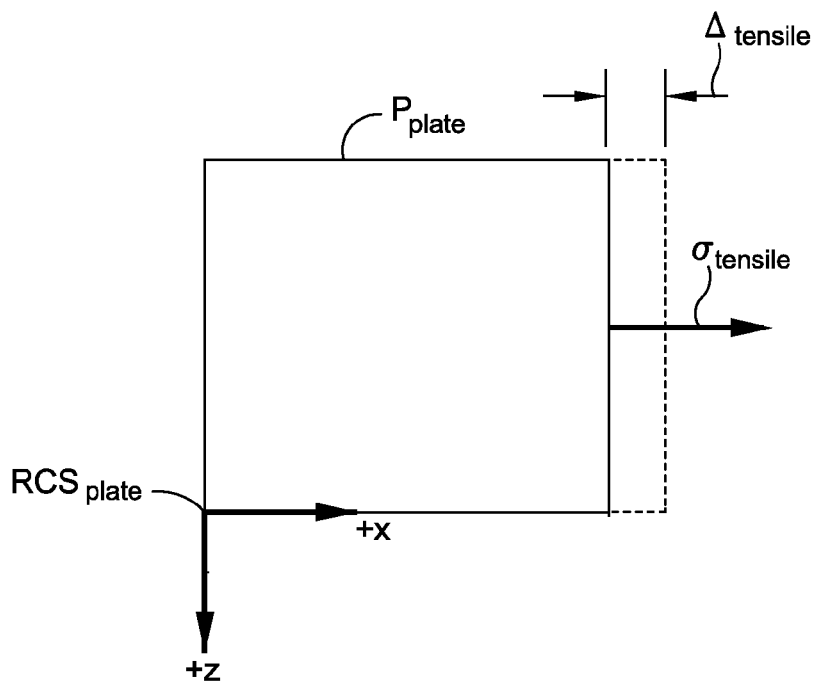
FIG. 6 is a side illustration of the plate element subjected to tensile stress acting on the plate surface and illustrating the normal (tensile) deformation of the element.
Figure 7:
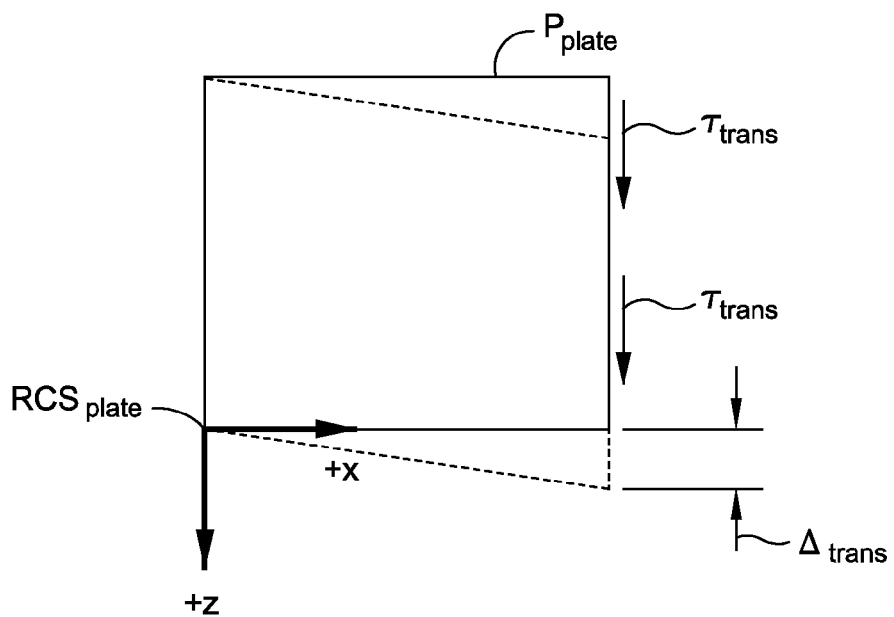
FIG. 7 is a side illustration of the plate element subjected to transverse shear stress acting parallel the plate surface and illustrating the transverse shear deformation of the element.

Referring briefly to FIGS. 6-7, shown is a plate element $P_{plate}$ subjected to tensile stress and transverse shear stress. FIG. 6 shows the extension of a side face of the element $P_{plate}$ as a result of the application of a tensile stress $\sigma_{tensile}$ a oriented perpendicular or normal to the side face and parallel to the x-axis of the element $P_{plate}$. The tensile stress $\sigma_{tensile}$ results in the deformation component $\Delta_{tensile}$ of the element $P_{plate}$ along a direction normal to the side face. FIG. 7 illustrates transverse shear deformation $\Delta_{trans}$ and shows the movement of the side face of the element $P_{plate}$ downwardly or transverse to the x-axis of the element $P_{plate}$. The application of the transverse shear stress $\sigma_{trans}$ parallel to the side face results in the element $P_{plate}$ being deformed into a parallelogram shape.

Figure 8:
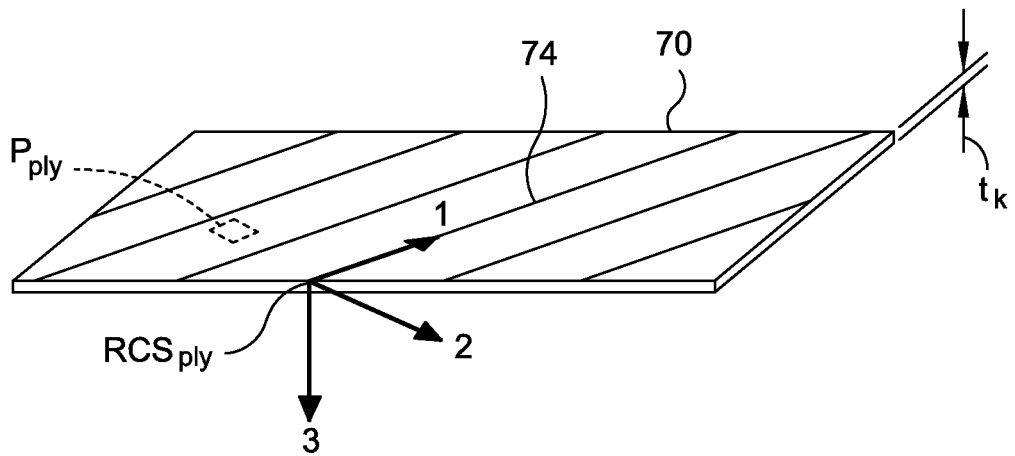
FIG. 8 is a perspective illustration of a ply of a composite laminate having a reference coordinate system oriented in alignment with a fiber direction of the ply.

Referring to FIG. 8, the stress-strain relationship of a unidirectional ply 70 formed of a given material system may be described by constitutive equations wherein the normal stress in the thickness $t_k$ direction is assumed to be zero. The ply 70 may be assumed to be homogenous and transversely isotropic and having five elastic constants referred to as engineering constants. With reference to the ply coordinate system $RCS_{ply}$, the engineering constants may include Young's (tensile) moduli $E_1$ and $E_2$, the shear modulus $G_{12}$, and Poisson's ratios $\nu_{21}$ and $\nu_{23}$. The ply 70 may be isotropic in the 2-3 plane such that the shear modulus $G_{23}$ may be expressed as:

$$G_{23} = \frac{E_{22}}{2(1+\nu_{23})} \quad \text{(Equation 140)}$$

and Poisson's ratio in the 1-2 and 1-3 directions may be expressed as follows:

$$\nu_{12} = \nu_{13} = \frac{E_{11}}{E_{22}}\nu_{21} \quad \text{(Equation 150)}$$

The stress-strain relationship of the unidirectional ply 70 in FIG. 8 may be described by the following:

$$\begin{pmatrix} \sigma_1 \\ \sigma_2 \\ \sigma_3 \\ \tau_{23} \\ \tau_{13} \\ \tau_{12} \end{pmatrix} = \begin{pmatrix} C_{11} & C_{12} & C_{12} & 0 & 0 & 0 \\ C_{12} & C_{22} & C_{23} & 0 & 0 & 0 \\ C_{12} & C_{23} & C_{22} & 0 & 0 & 0 \\ 0 & 0 & 0 & \frac{C_{22} - C_{23}}{2} & 0 & 0 \\ 0 & 0 & 0 & 0 & C_{66} & 0 \\ 0 & 0 & 0 & 0 & 0 & C_{66} \end{pmatrix} \begin{pmatrix} \varepsilon_{11} \\ \varepsilon_{22} \\ \varepsilon_{33} \\ 2\varepsilon_{23} \\ 2\varepsilon_{13} \\ 2\varepsilon_{12} \end{pmatrix}$$ (Equation 160)

wherein $C_{ij}$ are the coefficients of a stiffness matrix C for the ply 70. The C matrix relates stresses in the ply 70 to strains in the ply 70. The coefficients $C_{ij}$ may be expressed as a function of the five engineering constants $E_1$, $E_2$, $G_{12}$ and $v_{21}$, $v_{23}$:

$$C_{11} = E_{11}(1 - v_{23}^2)/\Delta \quad \text{(Equation 170)}$$

$$C_{22} = E_{22}\left(1 - \frac{E_{11}}{E_{22}} v_{21}^2\right)/\Delta \quad \text{(Equation 180)}$$

$$C_{12} = E_{11} v_{21}(1 + v_{23})/\Delta \quad \text{(Equation 190)}$$

$$C_{23} = E_{22}\left(v_{23} + \frac{E_{11}}{E_{22}} v_{21}^2\right)/\Delta \quad \text{(Equation 200)}$$

$$C_{66} = G_{12}/\Delta \quad \text{(Equation 210)}$$

wherein $\Delta$ is as follows:

$$\Delta = 1 - v_{23}^2 - 2(1 + v_{23})\frac{E_{11}}{E_{22}} v_{21}^2 \quad \text{(Equation 220)}$$

Figure 9:
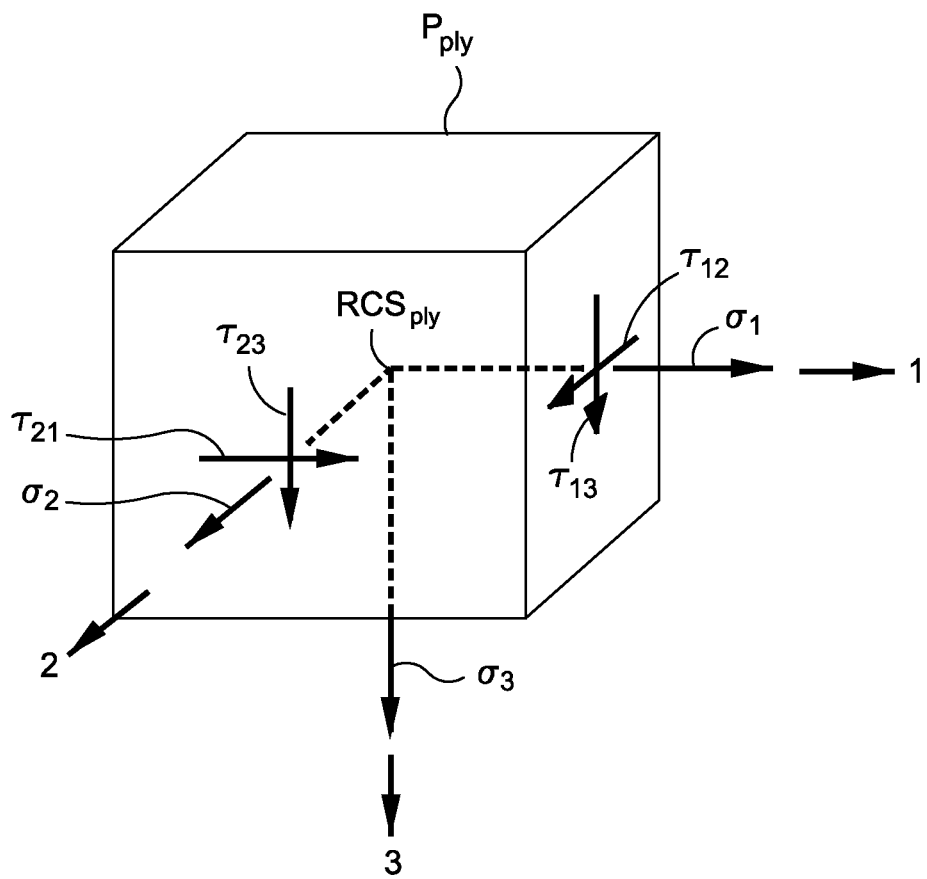
FIG. 9 is a perspective illustration of an infinitesimal ply element of the ply of FIG. 8 and illustrating the orientations of the tensile stresses and shear stresses in alignment with the ply coordinate system.

The ply 70 of the laminate 68 (FIG. 3) may be treated as a thin structure subject to a plane stress condition wherein stresses in the through-thickness or z-axis direction may be negligible relative to stresses $\sigma_1$, $\sigma_2$, $\sigma_{12}$ in the in-plane or 1-2 direction. In this regard, referring to the ply element $P_{ply}$ in FIG. 9, $\sigma_3 = \sigma_{23} = \sigma_{13} \approx 0$. The linear elastic stress-strain relationship for the transversely isotropic plies 70 of the laminate 68 under the plane stress condition may be expressed as follows:

$$\begin{pmatrix} \sigma_1 \\ \sigma_2 \\ \tau_{12} \end{pmatrix} = \begin{pmatrix} Q_{11} & Q_{12} & 0 \\ Q_{12} & Q_{22} & 0 \\ 0 & 0 & Q_{66} \end{pmatrix} \begin{pmatrix} \epsilon_1 \\ \epsilon_2 \\ \gamma_{12} \end{pmatrix} \quad \text{(Equation 230)}$$

wherein $Q_{ij}$ are coefficients of the reduced stiffness matrix. The reduced stiffness matrix is reduced in the sense that the size (i.e., quantity of rows and columns) of the matrix is reduced. The $Q_{ij}$ coefficients may relate stresses in the ply 70 to strains in the ply 70. The coefficients $Q_{ij}$ may be expressed in terms of the four (4) of the five (5) above-mentioned engineering constants $E_1$, $E_2$, $G_{12}$ and $v_{12}$. It should be noted that the minor Poisson's ration $v_{12}$ may be substituted for the above-mentioned major Poisson's ratio $v_{21}$ in view of the relationship:

$$v_{21} = \frac{E_2}{E_1} v_{12} \quad \text{(Equation 240)}$$

Figure 10:
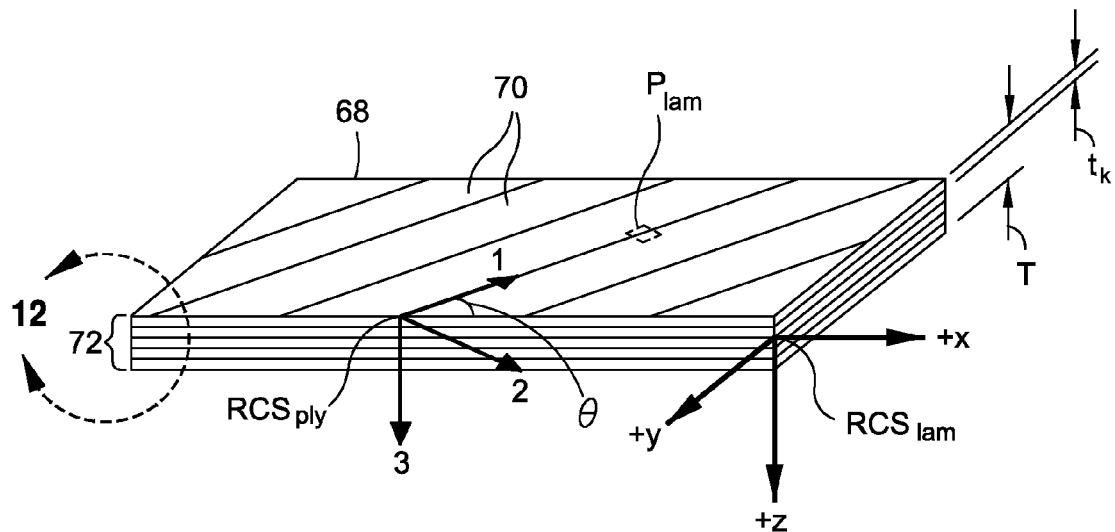
FIG. 10 is a perspective illustration of a laminate including a stack of plies and further illustrating the orientation of the ply coordinate system relative to the laminate coordinate system.

Referring to FIG. 10, shown is a laminate 68 comprised of a stack 72 of plies 70 and having a ply coordinate system $RCS_{ply}$ wherein the x-axis may be oriented in general alignment with a primary load path (not shown) passing through the laminate 68 although the x-axis may be oriented in any direction. Each one of the plies 70 may be oriented at a ply angle θ representing the angle between the 1-axis of the ply 70 and the x-axis of the laminate 68. The 1-axis of the ply 70 may correspond to a fiber direction 74 of the ply 70.

The above-described reduced stiffness matrix may be expressed in terms of the laminate coordinate system $RCS_{lam}$ by performing a coordinate transformation to rotate the laminate coordinate system $RCS_{lam}$ axes (x,y,z) into the ply coordinate system $RCS_{ply}$ axes (1,2,3) about the positive z-axis. The transformed reduced stiffness matrix may be expressed as follows:

$$\begin{pmatrix} \sigma_x \\ \sigma_y \\ \tau_{xy} \end{pmatrix} = \begin{pmatrix} \overline{Q}_{11}(\theta) & \overline{Q}_{13}(\theta) & \overline{Q}_{13}(\theta) \\ \overline{Q}_{12}(\theta) & \overline{Q}_{32}(\theta) & \overline{Q}_{23}(\theta) \\ \overline{Q}_{13}(\theta) & \overline{Q}_{23}(\theta) & \overline{Q}_{66}(\theta) \end{pmatrix} \begin{pmatrix} \epsilon_x \\ \epsilon_y \\ \gamma_{xy} \end{pmatrix} \quad \text{(Equation 250)}$$

wherein each one of the coefficients of the transformed reduced stiffness matrix is expressed as follows:

$$\overline{Q}_{11}(\theta) = Q_{11}\cos^4(\theta) + 2(Q_{12} + 2Q_{66})\sin^2(\theta)\cos^2(\theta) + Q_{22}\sin^4(\theta) \quad \text{(Equation 260)}$$

$$\overline{Q}_{12}(\theta) = (Q_{11} + Q_{22} - 4Q_{66})\sin^2(\theta)\cos^2(\theta) + Q_{12}(\sin^4(\theta) + \cos^4(\theta)) \quad \text{(Equation 270)}$$

$$\overline{Q}_{22}(\theta) = Q_{11}\sin^4(\theta) + 2(Q_{12} + 2Q_{66})\sin^2(\theta)\cos^2(\theta) + Q_{22}\cos^4(\theta) \quad \text{(Equation 280)}$$

$$\overline{Q}_{16}(\theta) = (Q_{11} - Q_{22} - 2Q_{66})\sin(\theta)\cos^3(\theta) + (Q_{12} - Q_{22} + 2Q_{66})\sin^3(\theta)\cos(\theta) \quad \text{(Equation 290)}$$

$$\overline{Q}_{26}(\theta) = (Q_{11} - Q_{22} - 2Q_{66})\sin^3(\theta)\cos(\theta) + (Q_{12} - Q_{22} + 2Q_{66})\sin(\theta)\cos^3(\theta) \quad \text{(Equation 300)}$$

$$\overline{Q}_{66}(\theta) = (Q_{11} + Q_{22} - 2Q_{12} - 2Q_{66})\sin^2(\theta)\cos^2(\theta) + Q_{66}(\sin^4(\theta) + \cos^4(\theta)) \quad \text{(Equation 310)}$$

For transverse shear strains, the stress-strain relationship for each ply 70 of the laminate 68 may be expressed as follows:

$$\begin{pmatrix} \tau_{23}^k \\ \tau_{13}^k \end{pmatrix} = \begin{pmatrix} Q_{44}^k & 0 \\ 0 & Q_{55}^k \end{pmatrix} \begin{pmatrix} \gamma_{23}^k \\ \gamma_{13}^k \end{pmatrix} \quad \text{(Equation 320)}$$

wherein the coefficients $Q_{44}$ and $Q_{55}$ for the transverse shear stiffness correspond to the shear moduli $G_{23}$ and $G_{12}$ as follows:

$$Q_{44}^k = G_{23}^k \quad \text{(Equation 330)}$$

and $$Q_{55}^k = G_{13}^k = G_{12}^k \quad \text{(Equation 340)}$$

Referring still to FIG. 10, the coefficients $Q_{44}$ and $Q_{55}$ may be defined in terms of the laminate coordinate system $RCS_{lam}$ by performing a coordinate transformation such that the stress-strain relationship with regard to the transverse shear strains in each ply 70 may be expressed as follows:

$$\begin{pmatrix} \tau_{yz}^k \\ \tau_{xz}^k \end{pmatrix} = \begin{pmatrix} \overline{Q}_{44}^k & \overline{Q}_{45}^k \\ \overline{Q}_{45}^k & \overline{Q}_{55}^k \end{pmatrix} \begin{pmatrix} \gamma_{yz}^k \\ \gamma_{xz}^k \end{pmatrix}$$ (Equation 350)

wherein coefficients $Q_{44}$ and $Q_{55}$ for the transverse shear stiffness in laminate coordinates are defined as follows:

$$\overline{Q}_{44}^k = Q_{44}^k \cos^2(\theta^k) + Q_{55}^k \sin^2(\theta^k)$$ (Equation 360)

$$\overline{Q}_{45}^k = (Q_{55}^k - Q_{44}^k)\cos(\theta^k)\sin(\theta^k)$$ (Equation 370)

$$\overline{Q}_{55}^k = Q_{55}^k \cos^2(\theta^k) + Q_{44}^k \sin^2(\theta^k)$$ (Equation 380)

As indicated earlier, the transverse shear strains are assumed to be constant such that the index k may be omitted from the strains above. In this regard, the shear strains in each ply 70 may be constant through the thickness T of the laminate 68.

Figure 12:
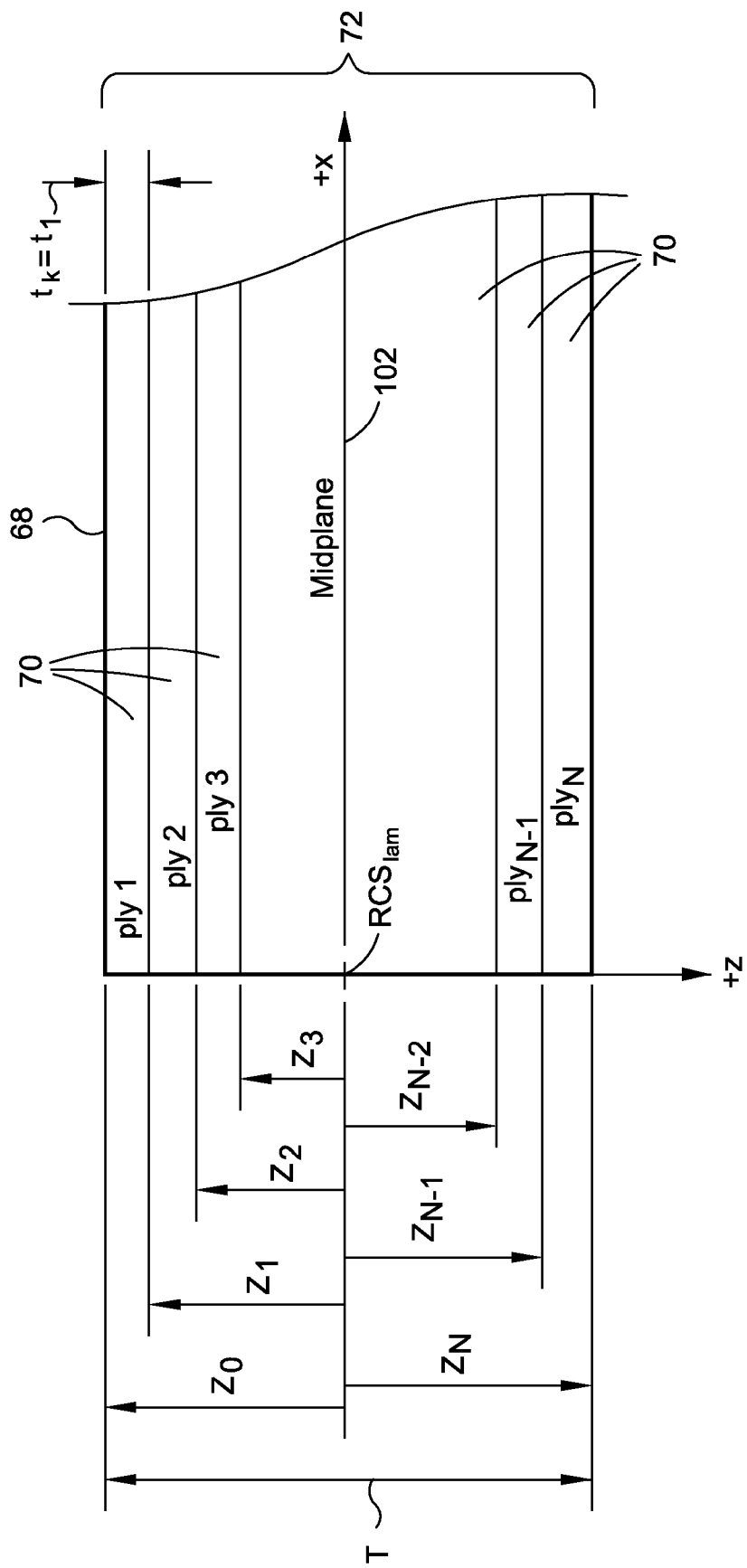
FIG. 12 is a side view of a portion of the ply stack taken along line 12 of FIG. 10 and illustrating the notation for ply position relative to a midplane of the laminate.

Referring to FIG. 12, the thickness $t_k$ of each ply k may be defined in terms of the laminate 68 and may be expressed as:

$$t_k = z_k - z_{k-1}$$ (Equation 390)

The location of the midplane (not shown) of each ply k relative to the midplane 102 of the laminate 68 may be expressed as follows:

$$E_k = (z_k + z_{k-1})/2$$ (Equation 400)

The thickness T of the laminate 68 containing N plies may be defined as the sum of the individual ply thicknesses $t_k$ as follows:

$$T = \sum_{k=1}^{N} t_k$$ (Equation 410)

In FIG. 12, the origin of the laminate 68 coordinate system $RCS_{lam}$ may be located at the midplane 102 of the laminate 68 such that the upper and lower bounds of the thickness T are defined by $z^0 = -T/2$ and $z_N = T/2$.

Referring back to FIG. 10, the stress-strain relationships for the laminate 68 may be defined by relating the stress and forces in the laminate 68 to the strains $\in_x, \in_y, \gamma_{xy}$), and curvatures κ previously described in Equations 60-110. The stress-strain relationships of the laminate 68 may be defined by the following expression:

$$\begin{pmatrix} N \\ M \\ Q \end{pmatrix} = C \begin{pmatrix} \epsilon \\ \kappa \\ \gamma \end{pmatrix}$$ (Equation 420)

wherein, on the left-hand side of Equation 420, N represents the resultant of extensional or in-plane force in the laminate 68, M represents the resultant of the bending moment in the laminate 68, and Q represents the resultant of transverse shear force in the laminate 68. The forces and moments N, M, Q are the through-thickness integrated sums of the forces and moments and may be expressed as follows:

$$N := \begin{pmatrix} N_x \\ N_y \\ N_{xy} \end{pmatrix} := \int_{-T/2}^{T/2} \begin{pmatrix} \sigma_x \\ \sigma_y \\ \tau_{xy} \end{pmatrix} dz$$ (Equation 430)

$$M := \begin{pmatrix} M_x \\ M_y \\ M_{xy} \end{pmatrix} := \int_{-T/2}^{T/2} z \begin{pmatrix} \sigma_x \\ \sigma_y \\ \tau_{xy} \end{pmatrix} dz$$ (Equation 440)

$$Q := \begin{pmatrix} Q_y \\ Q_x \end{pmatrix} := \int_{-T/2}^{T/2} \begin{pmatrix} \tau_{yz} \\ \tau_{xz} \end{pmatrix} dz$$ (Equation 450)

Figure 11:
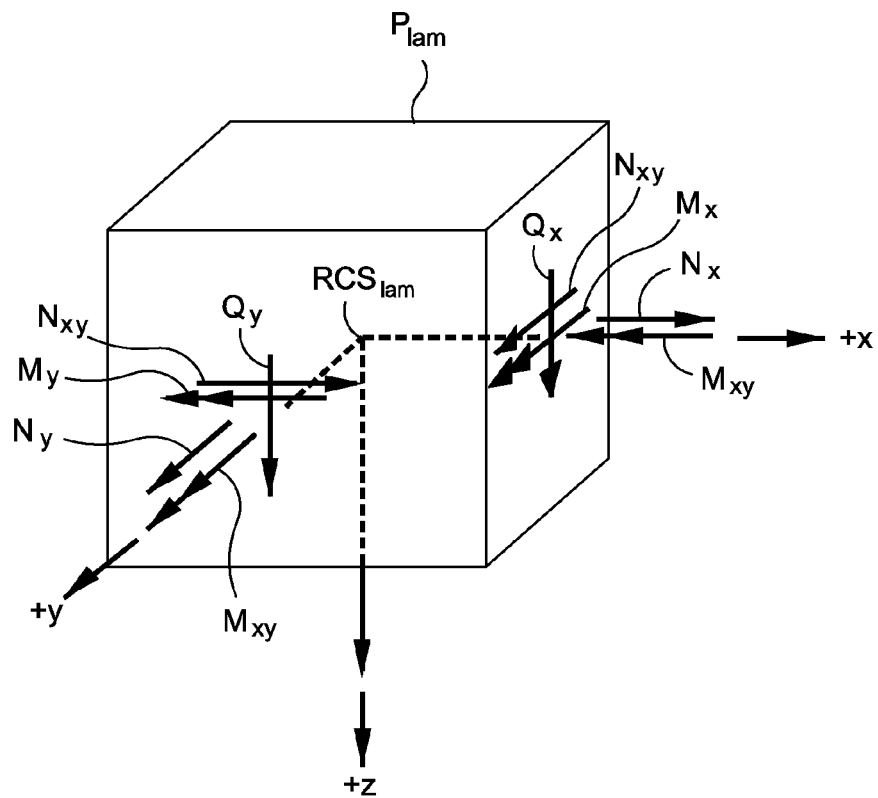
FIG. 11 is a perspective illustration of an infinitesimal laminate element of the laminate of FIG. 10 and illustrating the orientations of the tensile and shear forces and the moments in alignment with the laminate coordinate system.

FIG. 11 is a representative element of the laminate 68 and illustrates the orientations of the components of the forces and moments of N, M and Q.

On the right-hand side of Equation 420, $\in$ represents the in-plane strains in the laminate 68, κ represents curvatures of the laminate 68 under bending, and γ represents shear strains in the laminate 68. The forces and moments N, M, Q may be related to the strains $\in$, γ and curvatures κ by the stiffness coefficient C of the laminate 68 which may be expressed as follows:

$$C = \begin{pmatrix} A & B & 0 \\ B & D & 0 \\ 0 & 0 & G \end{pmatrix}$$ (Equation 460)

wherein A is the extensional stiffness matrix representing the extensional stiffness of the laminate 68, B is the coupling stiffness matrix representing the coupling stiffness of the laminate 68, and D is the bending stiffness matrix representing the bending stiffness of the laminate 68.

In the present disclosure, the stiffness matrices A, B, and D are collectively referred to as the in-plane/bending stiffness matrices representing the in-plane/bending stiffness of the laminate 68. The extensional stiffness matrix A represents the extensional stiffness of the laminate 68 and resistance to in-plane extension and shearing under in-plane loading. The bending stiffness matrix D represents the bending stiffness of the laminate 68 and resistance to out-of-plane bending. The coupling stiffness matrix B represents the coupling that may occur between the in-plane response and the bending response of the laminate 68 in composites. Such coupling may result in curvature in the laminate 68 when the laminate 68 is subjected to purely in-plane loading. The transverse shear stiffness of the laminate 68 is represented by the transverse shear stiffness matrix G.

The A, B, D, and G stiffness matrices may be defined as follows:

$$A := \begin{pmatrix} A_{11} & A_{12} & A_{16} \\ A_{12} & A_{22} & A_{26} \\ A_{16} & A_{26} & A_{66} \end{pmatrix}$$ (Equation 470)

$$A_{ij} = \sum_{k=1}^{N} (z_k - z_{k-1}) \overline{Q}_{ij}^k = \sum_{k=1}^{N} t_k \overline{Q}_{ij}^k$$ (Equation 480)

$$B := \begin{pmatrix} B_{11} & B_{12} & B_{16} \\ B_{12} & B_{22} & B_{26} \\ B_{16} & B_{26} & B_{66} \end{pmatrix}$$ (Equation 490)

$$B_{ij} = \sum_{k=1}^{N} \frac{z_k^2 - z_{k-1}^2}{2} \overline{Q}_{ij}^k = \sum_{k=1}^{N} \bar{z}_k t_k \overline{Q}_{ij}^k$$ (Equation 500)

-continued $$D := \begin{pmatrix} D_{11} & D_{12} & D_{16} \\ D_{12} & D_{22} & D_{26} \\ D_{16} & D_{26} & D_{66} \end{pmatrix}$$ (Equation 510)

$$D_{ij} = \sum_{k=1}^{N} \frac{z_k^2 - z_{k-1}^3}{3} \overline{Q}_{ij}^k = \sum_{k=1}^{N} \left( \frac{t_k^3}{12} + t_k \bar{z}_k^2 \right) \overline{Q}_{ij}^k$$ (Equation 520)

$$G := \begin{pmatrix} G_{44} & G_{45} \\ G_{45} & G_{55} \end{pmatrix}$$ (Equation 530)

$$G_{44} = k_y^2 \sum_{k=1}^{N} t_k \overline{Q}_{44}^k$$ (Equation 540)

$$G_{45} = k_x k_y \sum_{k=1}^{N} t_k \overline{Q}_{45}^k$$ (Equation 550)

$$G_{55} = k_x^2 \sum_{k=1}^{N} t_k \overline{Q}_{55}^k$$ (Equation 560)

wherein k represents a ply 70 in a stack 72 of plies 70 that make up the laminate 68, $\overline{Q}_{ij}$ represent coefficients of the $k^{th}$ ply and corresponds to the transformed reduced stiffness matrix illustrated in Equations 260-310 and Equations 360-380, and $k_x$ and $k_y$ are shear correction factors for the shear strains as described above.

Advantageously, the effect of the material properties on the above stiffness matrices may be isolated using material invariants U that may be based on the material properties of the plies 70 that make up the laminate 68. Such material invariants may simplify the expression of the stiffness matrices by substituting the exponents of the sines and cosines of the ply angle θ with the sines and cosines of 2θ and 4θ. The material invariants are not dependent upon the ply angle θ and are instead dependent upon the material properties (i.e., the engineering constants) of the ply materials.

The material invariants for the in-plane/bending stiffness of the laminate 68 may be expressed as follows:

$$U_1^k = \frac{1}{8}(3Q_{11} + 3Q_{22}^k + 2Q_{12}^k + 4Q_{66}^k)$$ (Equation 570)

$$U_2^k = \frac{1}{2}(Q_{11}^k - Q_{22}^k)$$ (Equation 580)

$$U_3^k = \frac{1}{8}(Q_{11}^k + Q_{22}^k - 2Q_{12}^k - 4Q_{66}^k)$$ (Equation 590)

$$U_4^k = \frac{1}{8}(Q_{11}^k + Q_{22}^k + 6Q_{12}^k - 4Q_{66}^k)$$ (Equation 600)

$$U_5^k = \frac{1}{8}(Q_{11}^k + Q_{22}^k - 2Q_{12}^k + 4Q_{66}^k)$$ (Equation 610)

Using the above-defined material invariants for the in-plane/bending stiffness of the laminate 68, the coefficients of the transformed reduced stiffness matrix may be expressed as follows:

$$\overline{Q}_{11}^k(\theta) = U_1^k + U_2^k \cos(2\theta) + U_3^k \cos(4\theta)$$ (Equation 620)

$$\overline{Q}_{12}^k(\theta) = U_4^k - U_3^k \cos(4\theta)$$ (Equation 630)

$$\overline{Q}_{22}^k(\theta) = U_1^k - U_2^k \cos(2\theta) + U_3 \cos(4\theta)$$ (Equation 640)

$$Q_{16}^k(\theta) = \frac{U_2^k}{2} \sin(2\theta) + U_3^k \sin(4\theta)$$ (Equation 650)

$$Q_{26}^k(\theta) = \frac{U_2^k}{2} \sin(2\theta) - U_3^k \sin(4\theta)$$ (Equation 660)

$$\overline{Q}_{66}^k(\theta) = U_5^k - U_3^k \cos(4\theta)$$ (Equation 670)

In the present disclosure, material invariants are introduced for the transverse (i.e., through-thickness) shear stiffness of the laminate 68. The material invariants for the transverse shear stiffness of the matrix isolate the effect of the material system on the transverse shear stiffness of the laminate 68. The material invariants for the transverse shear stiffness may be expressed as follows:

$$U_6^k = \frac{1}{2}(Q_{44}^k + Q_{55}^k)$$ (Equation 680)

$$U_7^k = \frac{1}{2}(Q_{44}^k - Q_{55}^k)$$ (Equation 690)

The coefficients $Q_{44}$ and $Q_{55}$ for the transverse shear stiffness in laminate coordinates may be expressed as follows:

$$\overline{Q}_{44}^k(\theta) = U_6^k + U_7^k \cos(2\theta)$$ (Equation 700)

$$\overline{Q}_{45}^k = -U_7^k \sin(2\theta)$$ (Equation 710)

$$\overline{Q}_{55}^k(\theta) = U_6^k - U_7^k \cos(2\theta)$$ (Equation 720)

While the material invariants U isolate the effect of the material system on the laminate stiffnesses, lamination parameters V isolate the effect of the ply stacking sequence (i.e., ply angles and ply thicknesses) on the laminate stiffness. In this regard, the lamination parameters V provide a means to characterize the geometric effect of the individual ply orientations in the laminate. In this manner, the material invariants U and the lamination parameters V improve the efficiency by which the laminate stiffness properties may be characterized. Furthermore, the use of lamination parameters V may reduce the quantity of design variables required to define the stiffnesses for a laminate such that laminates with large quantities of plies may be characterized in a reduced amount of time. In addition, laminates containing a large quantity of plies formed of different material systems may be characterized in a reduced amount of time.

A set of four (4) of the lamination parameters V may be defined for each one of the stiffness matrices A, B, and D for a total of twelve (12) lamination parameters for each material system used in the laminate 68 (FIG. 10). For certain laminate 68 configurations, the total quantity of lamination parameters for each material system may be reduced such as for symmetric (i.e., about the midplane 102), balanced (e.g., equal quantities of −45 degree plies and +45 degree plies) laminates and for other laminate configurations. The lamination parameters may be defined by the following:

$$V_{\lambda,m}^p = \sum_{k \in N^m} \frac{z_k^{p+1} - z_{k-1}^{p+1}}{(p+1)} f^\lambda(\theta_k)$$ (Equation 730)

wherein $$(f^\lambda(\theta)) = (1 \cdot \cos(2\theta) \cdot \sin(2\theta), \cos(4\theta), \sin(4\theta))$$ (Equation 740)

and $\theta_k$ represents the ply 70 (FIG. 10) angle of ply k; the index λ corresponds to the integer value 1, the index 2 corresponds to cos(2θ), the index 3 corresponds to sin(2θ), the index 4 corresponds to cos(4θ), and the index 5 corresponds to sin(4θ). It should be noted that $V_{1,m}^P$ is not defined as a lamination parameter. In this regard, the lamination parameters are defined by $V_{2,m}^P \ldots V_{5,m}^P$. The character p corresponds to one of the integer values 0, 1, 2 respectively representing the extensional stiffness matrix A, the coupling stiffness matrix B, and the bending stiffness matrix D, m represents the material system, $k \in N^m$ represents the set of plies 70 that belong to the same material system m. The lamination parameters V for the stiffness matrices for each one of the material systems may be determined using Equation 730.

Using the lamination parameters and the material invariants, the in-plane/bending stiffness matrices A, B, and D may be rewritten as follows:

$$(S_{ij}^p) = \sum_{m=1}^{N_{mat}} \begin{cases} U_1^m + & U_4^m V_{0,m}^p - & \frac{U_2^m}{2} V_{2,m}^p + \\ U_2^m V_{1,m}^p + & U_3^m V_{3,m}^p & U_3^m V_{4,m}^p \\ U_3^m V_{3,m}^p & & \\ U_4^m V_{0,m}^p - & U_1^m V_{0,m}^p - & \frac{U_2^m}{2} V_{2,m}^p - \\ U_3^m V_{3,m}^p & U_2^m V_{1,m}^p + & U_3^m V_{4,m}^p \\ & U_3^m V_{3,m}^p & \\ \frac{U_2^m}{2} V_{2,m}^p + & \frac{U_2^m}{2} V_{2,m}^p - & U_5^m V_{0,m}^p - \\ U_3^m V_{4,m}^p & U_3^m V_{4,m}^p & U_3^m V_{3,m}^p \end{cases}$$ (Equation 750)

wherein:

$A_{ij} = S_{ij}^0$ (Equation 760)

$B_{ij} = S_{ij}^1$ (Equation 770)

$D_{ij} = S_{ij}^2$ (Equation 780)

As noted above, p corresponds to one of the integer values 0, 1, 2 which respectively represent the extensional stiffness matrix A, the coupling stiffness matrix B, and the bending stiffness matrix D, m represents a material system, $N_{mat}$ represents the quantity of material systems in the laminate from m=1 to N, $U_i^k$ represent the material invariants, and $V_{\lambda,m}^p$ represents the lamination parameters.

For the transverse shear stiffness of the laminate 68, the transverse shear stiffness matrix G may be expressed as follow:

$$G := \begin{pmatrix} G_{44} & G_{45} \\ G_{45} & G_{55} \end{pmatrix}$$ (Equation 790)

wherein $G_{44}$, $G_{45}$, $G_{55}$ represent stiffness coefficients of the stiffness matrix G. The transverse shear stiffness matrix G may be written using the lamination parameters and the material invariants as follows:

$$G = \sum_{m=1}^{N_{mat}} \begin{pmatrix} k_y^2(U_6^m V_{0,m}^0 + U_7^m V_{1,m}^0) & -k_x k_y U_7^m V_{2,m}^0 \\ -k_x k_y U_7^m V_{2,m}^0 & k_x^2(U_6^m V_{0,m}^0 - U_7^m V_{1,m}^0) \end{pmatrix}$$ (Equation 800)

wherein m identifies the material system, $N_{mat}$ represents the quantity of material systems in the laminate 68 from m=1 to $N_{mat}$, $k_x$ and $k_y$ represent the shear correction factor, $V_{0,m}^0$, $V_{1,m}^0$, and $V_{2,m}^0$ represents the lamination parameters, and $U_6^m$ and $U_7^m$ represent the material invariants for the transverse shear stiffness.

As indicated above, the material invariants U are independent of the ply angle θ and are instead only a function of the material properties (i.e., the engineering constants) of the ply materials. In contrast, the lamination parameters V are independent of the material properties and are only function of the ply location $z_k$ and the ply angle θ at the location $z_k$. The separation of the material properties from the ply angles θ through the use of the material invariants U and the lamination parameters V provide a means for determining the contribution of the material properties to the overall stiffness of the laminate 68 (FIG. 10) relative to the contribution of the ply angle θ to the overall stiffness of the laminate 68. Furthermore, the lamination parameters reduce the total quantity of design variables required to characterize a laminate 68 relative to ply-by-ply definition techniques which require at least two design variables (e.g. one design variable for ply angle θ and one design variable for ply thickness) for each ply 70 of a laminate 68.

Advantageously, the values calculated for the in-plane/bending stiffness matrices and the values calculated for the transverse shear stiffness matrix may be used in a process of designing or configuring one or more composite structures or laminates. For example, the values of the stiffness matrices A, B, D, G may be used in reviewing design margins associated with a structure (not shown) during design, analysis, and/or testing of the structure. In addition, the systems and methodology disclosed here may be used in assessing the elastic properties of a structure under design, analysis, and/or testing. For example, the stiffness values calculated for the in-plane/bending stiffness matrices and the transverse shear stiffness matrix may be used in assessing the buckling stability of a composite laminate structure. The system and methodology may also be used in assessing the inelastic properties of a structure under design or analysis. For example, the values calculated for the extensional stiffness matrix, the bending stiffness matrix, the coupling stiffness matrix, and the transverse shear stiffness matrix may be used as values for fitting experimental strength data (e.g., material allowables).

Figure 13:
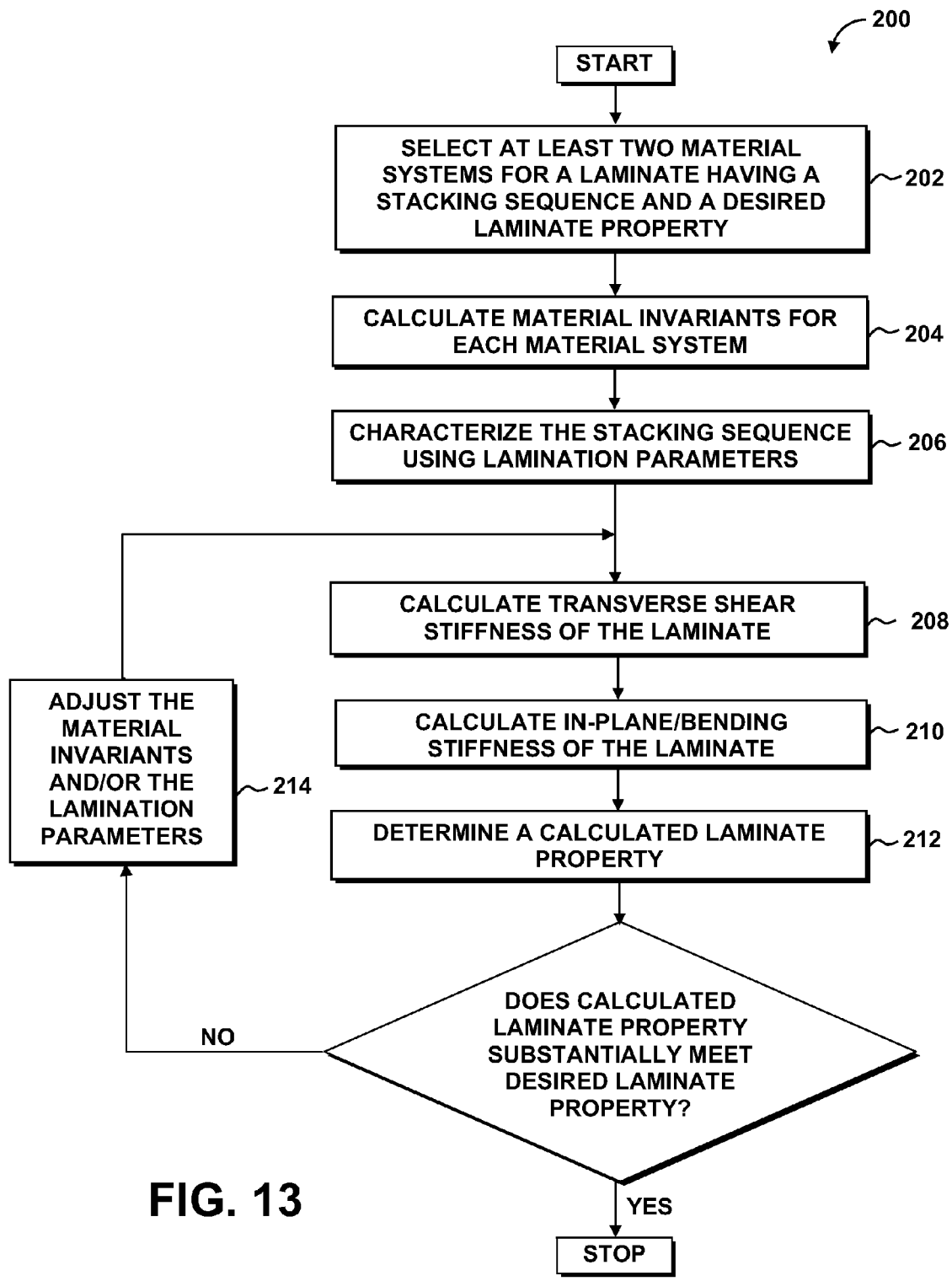
FIG. 13 is an illustration of a flow diagram representing one or more operations that may be included in a methodology of configuring a composite laminate.

Referring to FIG. 13, shown is a flow diagram of operations that may be included in a methodology 200 of configuring a composite panel or laminate 68 (FIG. 10). The composite laminate may be comprised of a stack 72 (FIG. 10) of plies 70 (FIG. 10) having a stacking sequence wherein the plies 70 in the stack 72 are oriented at one or more ply angles θ (FIG. 10) and are formed in one or more ply thicknesses $t_k$ (FIG. 10). The performance of a composite laminate 68 may be described by the stiffness of the composite laminate 68. The stiffness of a composite laminate 68 may be described in terms of the in-plane/bending stiffness as defined in the present disclosure wherein the in-plane/bending stiffness includes the extensional stiffness, the bending stiffness, and the coupling stiffness of the laminate 68. The stiffness of a laminate 68 may also be described in terms of the transverse shear stiffness of the laminate 68 which represents the resistance of the laminate 68 to transverse shear deformation.

Step 202 of the methodology 200 of FIG. 13 may include selecting at least two material systems for the plies 70 of an initial configuration of the composite laminate 68 (FIG. 10). Each material system has material properties comprising the elastic constants or engineering constants of the material as described above. The engineering constants include Young's (i.e., tensile) moduli $E_1$ and $E_2$, the shear modulus $G_{12}$, and Poisson's ratio $v_{12}$. As indicated above, a composite laminate having two or more material systems comprises a hybrid composite laminate 68 wherein each material system has a set of material properties and corresponding engineering constants $E_1$, $E_2$, $G_{12}$, and $v_{12}$. For example, a composite laminate may include eight (8) plies. Seven (7) of the eight (8) plies may be formed of unidirectional carbon fiber tape having a unique set of material properties (i.e., engineering constants). One (1) of the eight (8) plies may be formed of woven fiberglass cloth which has a unique set of material properties.

Step 204 of the methodology 200 of FIG. 13 may include calculating, for each one of the material systems, the material invariants based on the material properties. In this regard, the material invariants may be calculated using the four (4) independent in-plane engineering constants (i.e., $E_1$, $E_2$, $G_{12}$, and $v_{12}$). For each material system, a set of five material invariants $U_1$, $U_2$, $U_3$, $U_4$, $U_5$ may be calculated for the in-plane/bending stiffness matrices (i.e., the extensional, coupling, and bending stiffness matrices) using Equations 570-610 as discussed above. It should be noted that one (1) of the five (5) material invariants $U_5$ is defined in terms of two (2) of the other material invariants by the relationship $$U_5^k = \frac{1}{2}(U_1^k - U_4^k)$$

such that a total of four (4) independent material invariants may define the contribution of the material system to the laminate stiffness. The material invariants are independent of the ply 70 angle θ (FIG. 10) and are instead dependent upon the material properties (i.e., the engineering constants) of the ply 70 material system. In this regard, the material invariants of the in-plane/bending stiffness provide a means to isolate the effect of the material properties on the extensional, bending, and coupling stiffnesses of the laminate 68.

In addition, for each material system, two material invariants $U_6$, $U_7$ may be calculated for each material system. The material invariants $U_6$, $U_7$ for each material system may facilitate the determination of the transverse shear stiffness of the laminate 68. As indicated above, the material invariants $U_6$, $U_7$ for the transverse shear stiffness are based on the shear moduli $G_{13}$ and $G_{23}$ of the ply material system. In this regard, the material invariants for the transverse shear stiffness are dependent only upon the material properties of the ply material system and therefore provide a means to isolate the effect of the material system on the transverse shear stiffness of the laminate 68 from the effect of the ply angles on the transverse shear stiffness of the laminate 68.

Step 206 of the methodology 200 of FIG. 13 may include characterizing the stacking sequence of the laminate 68 (FIG. 10). The stacking sequence may be characterized by calculating, for each one of the material systems, a set of lamination parameters based on the ply angles θ (FIG. 10) and the ply thicknesses $t_k$ (FIG. 10) of the plies 70 (FIG. 10) in the laminate 68. For each material system, a set of four (4) of the lamination parameters may be calculated for each one of the stiffness matrices A, B, and D using Equations 730-740 resulting in a total of twelve (12) lamination parameters for each material system of the laminate 68. However, for certain laminate 68 configurations, a reduced quantity of lamination parameters may be calculated such as for certain balanced, symmetric ply arrangements. Advantageously, the combination of material invariants and lamination parameters facilitates a reduction in the complexity of the composite laminate design process by (a) separating the contribution of ply angle θ from the contribution of material property toward the stiffness of a laminate 68, and (b) utilizing a reduced quantity of design variables.

For example, for a composite laminate containing 100 plies of the same material system, a ply-by-ply determination of stiffness would require 100 design variables for the ply thicknesses of the plies in the laminate and 100 design variables for the ply angles of the plies in the laminate. Adding four (4) additional design variables for the four (4) engineering constants $E_1$, $E_2$, $G_{12}$, and $v_{12}$ results in a total of 204 design variables that are required to characterize the stiffness of the laminate.

Advantageously, the use of material invariants and lamination parameters provides a means to reduce the total quantity of design variables required to characterize the stiffness of a laminate. For example, using the same 100-ply laminate discussed in the example above, a total of five (5) material invariants may be calculated. However, because material variant $U_5$ is a function of $U_1$ and $U_4$ as indicated above, only four (4) independent material invariants (i.e., design variables) are required. Twelve (12) lamination parameters may also be calculated in the manner described above. Adding the quantity of independent material invariants to the quantity of lamination parameters results in a total of sixteen (16) design variables that are required to completely define the stiffnesses (i.e., in-plane/bending and transverse shear) of the laminate which represents a significant reduction in the complexity of the design process.

Step 208 of the methodology 200 of FIG. 13 may comprise calculating the transverse shear stiffness of the laminate 68 (FIG. 10) using the lamination parameters and the material invariants for the transverse shear stiffness. As indicated above in Step 204, the material invariants $U_6$, $U_7$ for the transverse shear stiffness are based on the shear moduli $G_{13}$ and $G_{23}$ of the ply material system. The transverse shear stiffness of the laminate 68 may be calculated by calculating the values of the transverse shear stiffness matrix G (Equation 530). As indicated above, transverse shear deformation in a composite laminate may affect the buckling stability of the laminate 68 (FIG. 10). In the present disclosure, the material invariants $U_6$ and $U_7$ for transverse shear stiffness are used in combination with the lamination parameters to provide a means for characterizing the transverse shear stiffness of the laminate 68 having two or more material systems. In addition, the use of material invariants and the lamination parameters provide a means to separate the contribution of the material properties to the transverse shear stiffness from the contribution of the ply angles θ to the transverse shear stiffness. As indicated above, the advantage provided by material invariants and lamination parameters is magnified when analyzing hybrid composite laminates containing plies formed of two or more material systems.

Step 210 of the methodology 200 of FIG. 13 may include calculating the in-plane/bending stiffness of the laminate 68 (FIG. 10). The in-plane/bending stiffness may include the extensional stiffness, the bending stiffness, and the coupling stiffness of the laminate 68. As indicated above, the extensional stiffness is represented by the extensional stiffness matrix A (Equation 470) which represents the resistance of the laminate 68 to in-plane extension and shearing under in-plane loading. The bending stiffness of the laminate 68 is represented by the bending stiffness matrix D (Equation 510) which represents the resistance of the laminate 68 to out-of-plane bending. The coupling stiffness is represented by the coupling stiffness matrix B (Equation 490) which represents the coupling of the in-plane response and the bending response that may occur in composite laminates. Step 210 may include calculating, using the lamination parameters and the material invariants for each one of the material systems, the values of the extensional stiffness matrix A, the coupling stiffness matrix B, and/or the bending stiffness matrix D as described above.

Step 212 of the methodology 200 of FIG. 13 may comprise calculating at least one laminate property of the laminate 68 (FIG. 10) based upon the characterized stiffness of the laminate 68. More specifically, one or more calculated laminate properties may be calculated based upon the values of the stiffness matrices determined in Step 212. Such calculated laminate properties may include, but are not limited to, the weight or mass properties of the laminate 68, margins of safety in relation to strength capabilities of the laminate 68, and other laminate properties. In this regard, the calculated laminate properties may include the buckling stability of the laminate 68 and other properties related to the strength of the laminate 68. The laminate properties may be calculated for an initial laminate configuration having two or more given ply material system(s) and a given stacking sequence (i.e., ply angle $\theta$ and ply thickness $t_k$).

In Step 214 of the methodology 200 of FIG. 13, the results of the calculated laminate properties may be compared to a desired set of laminate properties (e.g., weight, margins of safety, etc.). If the difference between the calculated laminate properties and the desired laminate properties is greater than a predetermined amount, the laminate 68 (FIG. 10) may be optimized by adjusting the values of the material invariants and/or the lamination parameters in an iterative manner as shown in FIG. 13 until the calculated laminate properties are within a predetermined range of the desired laminate properties. For example, if the weight and/or margins of safety of the laminate 68 are greater than the desired weight and/or desired margins of safety, the values of the material invariants and/or the lamination parameters for one or more of the material systems may be adjusted and the stiffnesses of the laminate may be re-calculated in Step 208 and/or Step 210 by calculating the values of the in-plane/bending matrices and/or the transverse shear stiffness matrix using the adjusted values of the material invariants and/or lamination parameters. The laminate properties may then be re-calculated based upon the newly calculated stiffness matrix values and compared to the desired laminate properties. The process may be repeated in an iterative manner until the calculated weight and/or margins of safety of the laminate 68 are within a predetermined range of the desired weight and/or margins of safety. In a preferred embodiment, the optimization process is such that the laminate configuration converges to a feasible solution having positive margins of safety with the lightest weight. The feasible solution may be represented by the values of the material invariants, the lamination parameters, and the matrix stiffness values which are a function of the material invariants and the lamination parameters.

Figure 14:
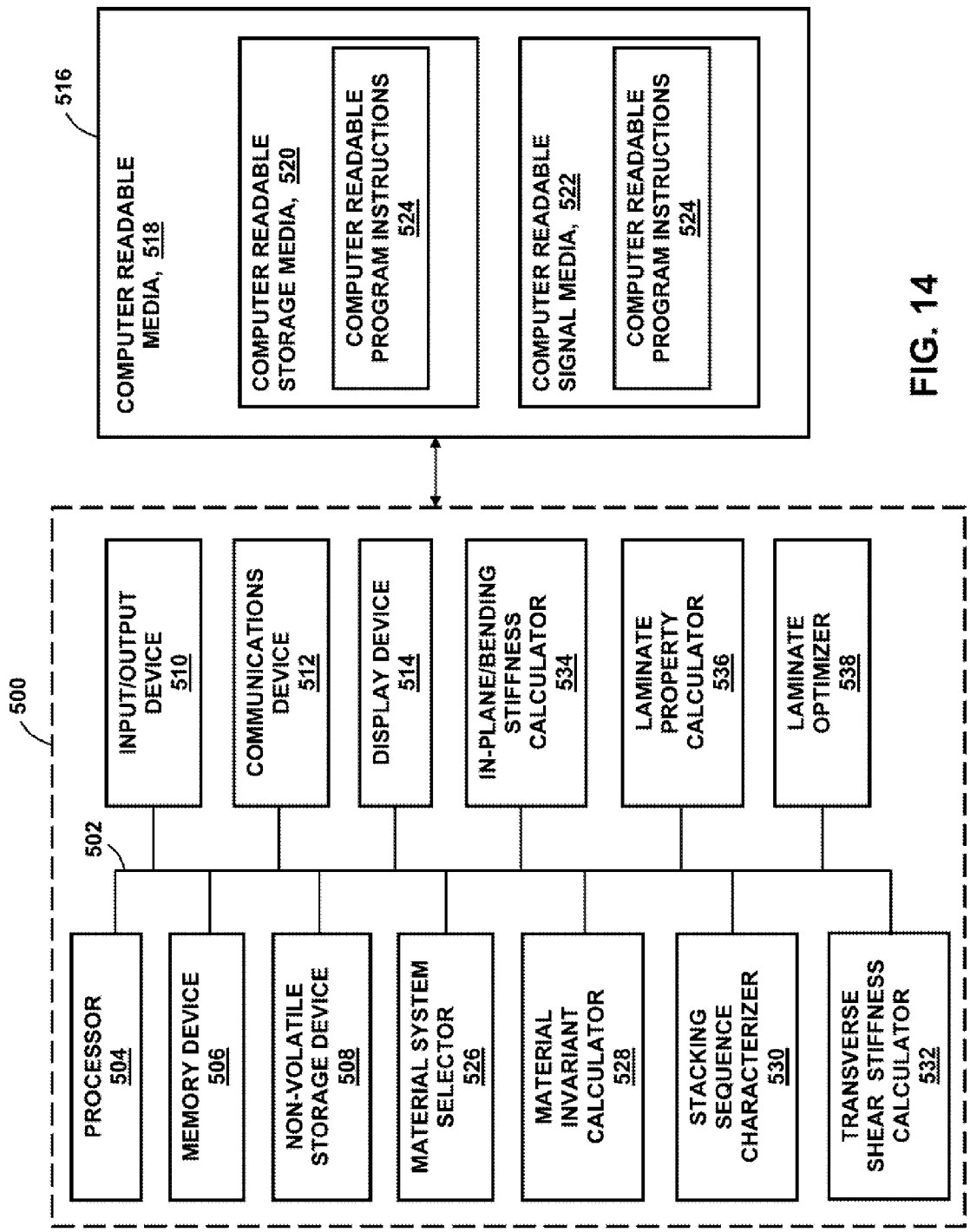
FIG. 14 is a block diagram of an embodiment of a processor-based system for implementing one or more operations of a methodology for configuring a composite laminate.

Referring to FIG. 14, the above-described methodologies, in whole or in part, may be implemented in a computer-implemented process such as on a processor-based system 500 or other suitable computer system. The processor-based system 500 may perform computable readable program instructions 524. The computable readable program instructions 524 may be provided to or loaded onto the processor-based system 500 in order to implement one or more of the above-described operations or steps. In a non-limiting example, the processor-based system 500 and/or the computable readable program instructions 524 may facilitate the configuration of a laminate 68 (FIG. 10) such as the characterization of in-plane/bending stiffness and/or transverse shear stiffness of the laminate 68 which may be comprised of a plurality of composite plies 70 of one or more material systems.

The block diagram of FIG. 14 illustrates the processor-based system 500 in an advantageous embodiment that may use material invariants and lamination parameters to calculate values of the extensional stiffness matrix, the coupling stiffness matrix, the bending stiffness matrix, and the transverse shear stiffness matrix, as described in greater detail below. In the embodiment illustrated in FIG. 14, the processor-based system 500 may include a data communication path 202 (e.g., data link) to communicatively couple one or more components to facilitate transfer of data between such components. The communication path 202 may comprise one or more data buses or any other suitable communication path that facilitates the transfer of data between the components and devices of the processor-based system 500.

In a non-limiting embodiment, the components may include one or more of a processor 504, a memory device 506, a non-volatile storage device 508, a communications device 512, an input/output device 510, a display device 514, a material system selector 526, a material invariant calculator 528, a stacking sequence characterizer 530, a transverse shear stiffness calculator 532, a in-plane/bending stiffness calculator 534, a laminate property calculator 536, and a laminate optimizer 538. The material system selector 526 may select at least two or more material system for potential use in the laminate 68 (FIG. 10). For example, the material system selector 526 may analyze the material properties of materials in a database (not shown) of material systems. The material system selector 526 may analyze the mechanical properties of the materials such as the elastic properties including the elastic moduli, the shear moduli including the transverse shear moduli, and the Poisson's ratios of one or more material systems. A user may manipulate the material system selector 526 using the input/output device 510 to facilitate selection of one or more material systems as shown in Step 202 (FIG. 13).

The material invariant calculator 528 in FIG. 13 may receive data regarding the material properties of one or more material systems from the material system selector 526 via the communication path 502 illustrated in FIG. 14. The material invariant calculator 528 may calculate, for at least one of the material systems, the material invariants based on the material properties in a manner as is described above in Step 204 (FIG. 13). For example, the material invariant calculator 528 may calculate the material invariants for the in-plane/bending stiffness of the laminate 68 (FIG. 10) according to Equations 570-610 and the material invariants for the transverse (i.e., through-thickness) shear stiffness of the laminate 68 according to Equations 680-690.

Referring still to FIG. 14, the stacking sequence characterizer 530 may characterize the stacking sequence of the laminate 68 (FIG. 10) for each material system. In this regard, the stacking sequence characterizer 530 may characterize the geometric effect of the individual ply orientations in the laminate 68 by calculating, for one or more of the material systems, a set of lamination parameters based upon the ply angles $\theta$ (FIG. 10) and thicknesses $t_k$ (FIG. 10) of the plies 70 in a laminate 68 as described above. The stacking sequence characterizer 530 may receive information regarding the ply angles $\theta$ and ply thicknesses $t_k$ via input by a user using an input/output device 510. The information may be transmitted via the communication path 502 illustrated in FIG. 14. The stacking sequence characterizer 530 may calculate four (4) of the lamination parameters for each one of the in-plane/bending stiffness matrices A, B, and D for a total of twelve (12) lamination parameters as described above in Step 206 (FIG.

13). However, depending upon the arrangement of the plies 70 in a laminate 68, the stacking sequence characterizer 530 may calculate fewer than twelve (12) lamination parameters for each one of the material systems.

The transverse shear stiffness calculator 532 may receive the material invariants for the transverse shear stiffness for each one of the material systems from the material invariant calculator 528 via the communication path 502. The transverse shear stiffness calculator 532 may receive the lamination parameters for each one of the material systems from the stacking sequence characterizer 530 via the communication path 502. The transverse shear stiffness calculator 532 may calculate the values for the transverse shear stiffness matrix G using the material invariants for the transverse stiffness and the lamination parameters for each one of the material systems in a manner as is described above in Step 208 (FIG. 13).

The in-plane/bending stiffness calculator 534 may receive, via the communication path 502, the material invariants for the in-plane/bending stiffness from the material invariant calculator 528 and the lamination parameters for each one of the in-plane/bending stiffness matrices A, B, and D from the stacking sequence characterizer 530. The in-plane/bending stiffness calculator 534 may calculate the in-plane/bending stiffness of the laminate. In this regard, the in-plane/bending stiffness calculator 534 may calculate, using the lamination parameters and the material invariants, values of the extensional stiffness matrix A, the coupling stiffness matrix B, and the bending stiffness matrix D using the equations mentioned above as described in Step 210.

The laminate property calculator 536 may receive the values for the transverse shear stiffness matrix G from the transverse shear stiffness calculator 532 and the values for the in-plane/bending stiffness matrices A, B, and D from the in-plane/bending stiffness calculator 534 via the communication path 502. The laminate property calculator 536 may calculate one or more laminate properties (e.g., weight, margins of safety) of the laminate based upon the values of the stiffness matrices as described above in Step 212 (FIG. 13). Such laminate properties may include the mass properties, margins of safety, and other properties representing the performance of the laminate.

The laminate optimizer 538 may compare the one or more laminate properties (e.g., weight or mass properties of the laminate, margins of safety of the laminate, etc.) calculated by the laminate property calculator 536 with one or more corresponding desired laminate properties of the laminate 68 (FIG. 10). The laminate optimizer 539 may adjust the material invariants, the lamination parameters, or both the material invariants and the lamination parameters, if the difference between the calculated laminate properties and the desired laminate properties is greater than a predetermined amount or is outside of a predetermined range. The laminate optimizer 538 may transmit the adjusted material invariants and/or lamination parameters to the transverse shear stiffness calculator 532 and the in-plane/bending stiffness calculator 534 for re-calculation of the values of the in-plane/bending stiffness matrices and the transverse shear stiffness matrix using the adjusted material invariants and/or lamination parameters. The laminate property calculator 536 may re-calculate the laminate properties based upon the newly calculated stiffness matrix values. The laminate optimizer 538 may compare the calculated laminate properties to the desired laminate properties. The process may be repeated until the calculated laminate properties are within a predetermined range of the desired laminate properties as described above with regard to Steps 208-214.

The display device 514 may receive the values for the material invariants, the lamination parameters, the values of the in-plane/bending matrices and the transverse shear stiffness matrix, and the calculated and desired laminate properties from one or more of the corresponding components of the processor-based system 500 via the communication path 502. The display device 514 may also display values for the engineering constants, the ply angles θ (FIG. 10), and the ply thicknesses $t_k$ (FIG. 10) associated with the material invariants and lamination parameters. The display device 514 may display the values on the display device 514 as a graphical display and/or as numerical values.

In an embodiment, the processor-based system 500 may include one or more of the processors 504 for executing instructions of computable readable program instructions 524 that may be installed into the memory device 506. Alternatively, the processor 504 may comprise a multi-processor core having two or more integrated processors cores. Even further, the processor 504 may comprise a main processor and one or more secondary processors integrated on a chip. The processor 504 may also comprise a many-processor system having a plurality of similarly configured processors.

Referring still to FIG. 14, the processor-based system 500 may further include one or more memory devices 506 which may comprise one or more of volatile or non-volatile storage devices 508. However, the memory device 506 may comprise any hardware device for storing data. For example, the memory device 506 may comprise a random access memory or a cache of an interface and/or integrated memory controller hub which may be included in the communication path 202. The memory device 506 may be configured to permanently and/or temporarily store any one of a variety of different types of data, computer readable code or program instructions 524, or any other type of information. The non-volatile storage device 508 may be provided in a variety of configurations including, but not limited to, a flash memory device, a hard drive, an optical disk, a hard disk, a magnetic tape or any other suitable embodiment for long-term storage. In addition, the non-volatile storage device 508 may comprise a removable device such as a removable hard drive.

The processor-based system 500 may additionally include one or more of the input/output devices 510 to facilitate the transfer of data between components that may be connected to the processor-based system 500. The input/output device 510 may be directly and/or indirectly coupled to the processor-based system 500. The input/output device 510 may facilitate user-input by means of a peripheral device such as a keyboard, a mouse, a joystick, a touch screen and any other suitable device for inputting data to the processor-based system 500. The input/output device 510 may further include an output device for transferring data representative of the output of the processor-based system 500. For example the input/output device 510 may comprise a display device 514 such as a computer monitor or computer screen for displaying results of data processed by the processor-based system 500. The input/output device 510 may optionally include a printer or fax machine for printing a hardcopy of information processed by the processor-based system 500.

Referring still to FIG. 14, the processor-based system 500 may include one or more communications devices 512 to facilitate communication of the processor-based system 500 within a computer network and/or with other processor-based systems. Communication of the processor-based system 500 with a computer network or with other processor-based systems may be by wireless means and/or by hardwire connection. For example, the communications device 512 may comprise a network interface controller to enable wireless or cable communication between the processor-based system 500 and a computer network. The communications device 512 may also comprise a modem and/or a network adapter or any one of a variety of alternative device for transmitting and receiving data.

One or more of the operations of the methodology described above for configuring a laminate 68 (FIG. 10) may be performed by the processor 504 and/or by one or more of the material system selector 526, the material invariant calculator 528, the stacking sequence characterizer 530, the transverse, shear stiffness calculator 532, the in-plane/bending stiffness calculator 534, the laminate property calculator 536, and/or the laminate optimizer 538 using the computer readable program instructions 524. The computer readable program instructions 524 may comprise program code which may include computer usable program code and computer readable program code. The computer readable program instructions 524 may be read and executed by the processor 504. The computer readable program instructions 524 may enable the processor 504 to perform one or more operations of the above-described embodiments associated with characterizing the stiffness of a laminate 68 or otherwise configuring a laminate 68.

Referring still to FIG. 14, the computer readable program instructions 524 may include operating instructions for the processor-based system 500 and may further include applications and programs. The computer readable program instructions 524 may be contained and/or loaded onto one or more of memory devices 506 and/or non-volatile storage devices 508 for execution by the processor 504 and/or by the material system selector 526, the material invariant calculator 528, the stacking sequence characterizer 530, the transverse shear stiffness calculator 532, the in-plane/bending stiffness calculator 534, the laminate property calculator 536, and/or the laminate optimizer 538. As indicated above, one or more of the memory devices 506 and/or non-volatile storage devices 508 may be communicatively coupled to one or more of the remaining components illustrated in FIG. 14 through the communication path 202.

The computer readable program instructions 524 may be contained on tangible or non-tangible, transitory or non-transitory computer readable media 518 and which may be loaded onto or transferred to the processor-based system 500 for execution by the processor 504. The computer readable program instructions 524 and the computer readable media 518 comprise a computer program product 516. In an embodiment, the computer readable media 518 may comprise computer readable storage media 520 and/or computer readable signal media 522.

The computer readable storage media 520 may comprise a variety of different embodiments including, but not limited to, optical disks and magnetic disks that may be loaded into a drive, a flash memory device or other storage device or hardware for transfer of data onto a storage device such as a hard drive. The computer readable storage media 520 may be non-removably installed on the processor-based system 500. The computer readable storage media 520 may comprise any suitable storage media and may include, without limitation, a semiconductor system or a propagation medium. In this regard, the computer readable storage media 520 may comprise electronic media, magnetic media, optical media, electromagnetic media, and infrared media. For example, the computer readable storage media 520 may comprise magnetic tape, a computer diskette, random access memory and read-only memory. Non-limiting examples of embodiments of optical disks may include compact disks-read only memory, compact disks-read/write, and digital video disks.

The computer readable signal media 522 may contain the computer readable program instructions 524 and may be embodied in a variety of data signal configurations including, but not limited to, an electromagnetic signal and an optical signal. Such data signals may be transmitted by any suitable communications link including by wireless or hardwire means. For example, the hardwire means may comprise an optical fiber cable, a coaxial cable, a signal wire and any other suitable means for transmitting the data by wireless or by physical means.

Referring still to FIG. 14, the computer readable signal media 522 may facilitate the downloading of the computer readable program instructions 524 to the non-volatile storage or other suitable storage or memory device for use within processor-based system 500. For example, the computer readable program instructions 524 contained within the computer readable storage media 520 may be downloaded to the processor-based system 500 over a computer network from a server or client computer of another system.

Any one of a variety of different embodiments of the processor-based system 500 may be implemented using any hardware device or system capable of executing the computer readable program instructions 524. For example, the processor 504 may comprise a hardware unit configured for performing one or more particular functions wherein the computer readable program instructions 524 for performing the functions may be pre-loaded into the memory device 506.

In an embodiment, the processor 504 may comprise an application specific integrated circuit (ASIC), a programmable logic device, or any other hardware device configured to perform one or more specific functions or operations. For example, a programmable logic device may be temporarily or permanently programmed to perform one or more of the operations related to characterizing the stiffness of a laminate or otherwise configuring a laminate 68. The programmable logic device may comprise a programmable logic array, programmable array logic, a field programmable logic array, and a field programmable gate array and any other suitable logic device, without limitation. In an embodiment, the computer readable program instructions 524 may be operated by the one or more processor 504 and/or by other devices including one or more hardware units in communication with the processor 504. Certain portions of the computer readable program instructions 524 may be the processor 504 and other portions of the computer readable program instructions 524 may be run by the hardware units.

Advantageously, the various embodiments described above provide the ability to efficiently determine the stiffness characteristics including the transverse shear stiffness of laminates comprised of a large quantity of plies formed of different material systems as may be desirable for thick laminates where buckling stability is a design consideration. In this regard, the various systems and methods disclosed herein advantageously accommodate hybrid composite laminates comprised of plies formed of two or more material systems. For example, the systems and methods disclosed accommodate composite laminates comprised of carbon fiber or graphite/epoxy unidirectional tape plies and fiberglass cloth plies for impact resistance and/or metallic plies for conducting static electricity. The embodiments of the system and methods disclosed herein advantageously employ material invariants and lamination parameters in the determination of the stiffness of a composite laminate in a computationally efficient manner to calculate the in-plane/bending stiffness and the transverse shear stiffness of composite laminates having large quantities of plies formed of different material systems. In this regard, the technical effect of performing one or more of the above-described operations is an increase in the efficiency and accuracy of the analysis of complex, multi-ply, hybrid composite structures where transverse shear stiffness is a design consideration such that the performance of one or more of the above-described operations results in an improvement in performance of such composite structures and a decrease in weight of such structures.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of configuring a composite laminate comprised of a stack of plies having a stacking sequence, comprising the steps of:
    selecting at least two different material systems for the laminate, the laminate being formed of a stack of plies, each one of the plies having a ply angle, each one of the material systems having material properties and corresponding material invariants, the material invariants being independent of the ply angle;
    characterizing the stacking sequence for each material system using lamination parameters;
    calculating a transverse shear stiffness of the laminate using the material invariants and the lamination parameters; and
    calculating a coupling stiffness representing the coupling of an in-plane response of the laminate and a bending response of the laminate.

2. The method of claim 1 wherein the material properties of each material system include transverse shear moduli, the step of calculating the transverse shear stiffness including:
    calculating the material invariants for the transverse shear stiffness based on the transverse shear moduli; and
    calculating the transverse shear stiffness based on the material invariants for the transverse shear stiffness and the lamination parameters.

3. The method of claim 1 wherein the plies in the stack are oriented at one or more ply angles and are formed in one or more ply thicknesses, the step of characterizing the stacking sequence including:
    calculating the lamination parameters based on the ply angles and the ply thicknesses.

4. The method of claim 1 further comprising the step of:
    calculating an in-plane/bending stiffness of the laminate using the material invariants and the lamination parameters; and
    the in-plane/bending stiffness comprising an extensional stiffness of the laminate, a bending stiffness of the laminate, and the coupling stiffness of the laminate.

5. The method of claim 4 wherein:
    the extensional stiffness represents a resistance of the laminate to in-plane extension and shearing under in-plane loading; and
    the bending stiffness of the laminate represents the resistance of the laminate to out-of-plane bending.

6. The method of claim 4 wherein the laminate has a desired laminate property, the method further comprising the steps of:
    calculating at least one laminate property based on the transverse shear stiffness and the in-plane/bending stiffness; and
    adjusting at least one of the following until the calculated laminate property is within a predetermined range of the desired laminate property:
    the material invariants;
    the lamination parameters.

7. The method of claim 6 wherein the laminate property comprises at least one of the following:
    a margin of safety of the laminate;
    a weight of the laminate.

8. A method of configuring a laminate having a stack of plies oriented at one or more ply angles and formed in one or more ply thicknesses, the laminate having a desired laminate property, comprising the steps of:
    selecting at least two material systems for the plies of the laminate, each one of the material systems having material properties;
    calculating, for each material system, material invariants based on the material properties;
    calculating, for each material system, lamination parameters based on the ply angles and the ply thicknesses;
    calculating a transverse shear stiffness of the laminate using the material invariants and the lamination parameters;
    calculating an in-plane/bending stiffness of the laminate using the material invariants and the lamination parameters, the in-plane/bending stiffness comprising an extensional stiffness of the laminate, a bending stiffness of the laminate, and a coupling stiffness of the laminate;
    calculating a laminate property based on the transverse shear stiffness and the in-plane/bending stiffness of the laminate; and
    adjusting at least one of the following until the calculated laminate property is within a predetermined range of the desired laminate property:
    the material invariants;
    the lamination parameters.

9. The method of claim 8 wherein:
    the material properties of each material system include transverse shear moduli;
    the step of calculating material invariants including calculating the material invariants for the transverse shear stiffness based on the transverse shear moduli; and
    the step of calculating the transverse shear stiffness comprising calculating, using the lamination parameters and the material invariants for the transverse shear stiffness, values of a transverse shear stiffness matrix.

10. The method of claim 9 wherein:
    the step of calculating the in-plane/bending stiffness comprises calculating, using the lamination parameters and the material invariants, values of at least one of the extensional stiffness matrix, the coupling stiffness matrix, and the bending stiffness matrix.

11. The method of claim 10 further comprising the steps of:
    calculating the laminate property based on the values of the stiffness matrices.

12. The method of claim 11 wherein the laminate property comprises at least one of the following:
    a margin of safety of the laminate;
    a weight of the laminate.

13. A processor-based system for configuring a composite laminate, comprising:
    a material system selector for selecting at least two material systems of the laminate, the laminate being formed of a stack of plies, each one of the plies having a ply angle, each one of the material systems having material properties and corresponding material invariants, the material invariants being independent of the ply angle;

a stacking sequence characterizer for characterizing a stacking sequence of the laminate for each material system using lamination parameters;

a transverse shear stiffness calculator for calculating a transverse shear stiffness of the laminate using the material invariants and the lamination parameters; and calculating a coupling stiffness representing the coupling of an in-plane response of the laminate and a bending response of the laminate.

14. The processor-based system of claim 13 further comprising:
a material invariant calculator for calculating the material invariants of the transverse shear stiffness.

15. The processor-based system of claim 14 wherein:
the material properties of each material system include transverse shear moduli; and
the material invariant calculator calculating the material invariants for the transverse shear stiffness based on the transverse shear moduli.

16. The processor-based system of claim 13 wherein:
the plies in the stack are oriented at one or more ply angles and are formed in one or more ply thicknesses; and
the stacking sequence characterizer calculating the lamination parameters based on the ply angles and the ply thicknesses.

17. The processor-based system of claim 13 further comprising:
an in-plane/bending stiffness calculator for calculating an in-plane/bending stiffness of the laminate using the material invariants and the lamination parameters; and the in-plane/bending stiffness comprising an extensional stiffness of the laminate, a bending stiffness of the laminate, and a coupling stiffness of the laminate.

18. The processor-based system of claim 17 wherein:
the transverse shear stiffness calculator calculating, using the lamination parameters and the material invariants for the transverse shear stiffness, values of a transverse shear stiffness matrix; and
the in-plane/bending stiffness calculator calculating, using the lamination parameters and the material invariants, values of at least one of the extensional stiffness matrix, the coupling stiffness matrix, and the bending stiffness matrix.

19. The processor-based system of claim 18 wherein the laminate has a desired laminate property, further comprising:
a laminate property calculator for calculating a laminate property based on the transverse shear stiffness and the in-plane/bending stiffness of the laminate; and
a laminate optimizer for by adjusting at least one of the following until the calculated laminate property is within a predetermined range of the desired laminate property:
the material invariants;
the lamination parameters.

20. The processor-based system of claim 19 wherein the laminate property comprises at least one of the following:
a margin of safety of the laminate;
a weight of the laminate.

* * * * *